United States Patent
Al-Qurishi et al.

(10) Patent No.: US 12,411,856 B2
(45) Date of Patent: Sep. 9, 2025

(54) METHOD AND APPARATUS FOR IDENTIFYING SIMILAR DATA ELEMENTS USING STRING MATCHING

(71) Applicant: Elm, Riyadh (SA)

(72) Inventors: Muhammad Saleh Al-Qurishi, Riyadh (SA); Mohamed Ibrahim Basha, Riyadh (SA); Riad Souissi, Riyadh (SA)

(73) Assignee: Elm, Riyadh (SA)

( * ) Notice: Subject to any disclaimer, the term of this patent is extended or adjusted under 35 U.S.C. 154(b) by 310 days.

(21) Appl. No.: 17/881,798

(22) Filed: Aug. 5, 2022

(65) Prior Publication Data

US 2023/0195735 A1 Jun. 22, 2023

Related U.S. Application Data

(60) Provisional application No. 63/292,721, filed on Dec. 22, 2021.

(51) Int. Cl.
| | |
|---|---|
| G06F 16/00 | (2019.01) |
| G06F 16/22 | (2019.01) |
| G06F 16/2452 | (2019.01) |
| G06F 16/2457 | (2019.01) |
| G06F 40/263 | (2020.01) |
| G06F 40/284 | (2020.01) |
| G06F 40/58 | (2020.01) |

(52) U.S. Cl.
CPC .... *G06F 16/24578* (2019.01); *G06F 16/2255* (2019.01); *G06F 16/2452* (2019.01); *G06F 40/263* (2020.01); *G06F 40/284* (2020.01); *G06F 40/58* (2020.01)

(58) Field of Classification Search
CPC .......... G06F 16/24578; G06F 16/2452; G06F 16/2255
USPC ...................................... 707/728
See application file for complete search history.

(56) References Cited

U.S. PATENT DOCUMENTS

2019/0129952 A1* 5/2019 Yoshida ............ G06F 16/24578
2019/0354596 A1* 11/2019 Mirylenka ............ G06F 16/215

* cited by examiner

*Primary Examiner* — Chelcie L Daye
(74) *Attorney, Agent, or Firm* — Oblon, McClelland, Maier & Neustadt, L.L.P.

(57) ABSTRACT

Disclosed is a method and apparatus for identifying similar record elements to a query, the method including receiving a query, determining an index for the query, generating candidate records from a reference list to match the query based on the index and applying any one or any combination of a q-gram filter, a length filter, and a shared character count (SCC) filter, determining similarity scores of each of the candidate records identifying records from among the candidate records having a similarity score greater than or equal to a threshold, selecting data records similar to the query based on sorting the selected records according to respective similarity scores, and outputting one or more of the selected data records.

22 Claims, 23 Drawing Sheets

FIG. 9

Input: $F_r$ records file, $T$ similarity threshold, $q$ q-gram, $f$ maximum q-gram frequency, $M$ verification method.

Output: ⌒ list of similar pairs.

1: begin
2: $\quad s \leftarrow 2^{16}$
3: $\quad \text{⌒} \leftarrow \{\}$
4: $\quad for\ i \leftarrow 0, 1, \ldots, s - 1\ do$ //initialize arrays with null
5: $\quad\quad \{\ A_h \leftarrow null$
6: $\quad\quad A_c \leftarrow null$
7: $\quad\quad \}$
8: $\quad v_1 \leftarrow 1 - q + qT$
9: $\quad v_2 \leftarrow q - 1$
10: $\quad n \leftarrow 0$ \quad //number of records
11: $\quad while\ (!(EOF(F_r)))\ do$
12: $\quad\quad \{\ q_i, A_r[n] \leftarrow readLine(F_r)$ \quad // read a record from input file
13: $\quad\quad n \leftarrow n + 1$
14: $\quad\quad A_b[] \leftarrow 0$ // reset bit array of size $n$ with bit 0
15: $\quad\quad A_{cl}[i] \leftarrow 0$ // $A_{cl}$ be a q-gram count list
16: $\quad\quad A_c, A_d, n_c \leftarrow$ Algorithm-2 $(q_i)$ \quad // call algorithm 2
17: $\quad\quad for\ k \leftarrow q - 1,\quad q, \ldots, |q_i| - 1\ do$
18: $\quad\quad\quad \{\ \hbar \leftarrow h(q_i, k)$ \quad // equation 1
19: $\quad\quad\quad if(A_h[\hbar] = null)$
20: $\quad\quad\quad\quad Add\ i\ to\ group\ \hbar\ in\ array\ A_h$
21: $\quad\quad\quad else\ if\ ((A_h[\hbar].Last \neq i)\ and\ (|A_h[\hbar]| < f))$
22: $\quad\quad\quad\quad \{$
23: $\quad\quad\quad\quad for\ r \leftarrow 0,\quad 1, \ldots, |A_h[\hbar]| - 1\ do$

FIG. 9 (Cont'd)

24:          $if(A_b[A_h[h][r]] \neq 1)$
25:          {
26:          $r_e \leftarrow A_r[A_h[h][r]]$
27:          $A_{cl}[A_h[h][r]] \leftarrow A_{cl}[A_h[h][r]] + 1$
28:          $\eta \leftarrow A_{cl}[A_h[h][r]]$    //count of current q-gram
29:          $if(\text{Algorithm-3}(q_i, r_e, v_1, v_2, \eta, T, A_c, A_d, n_c) = true)$
30:          $\omega \leftarrow \omega \cup \{(q_i, r_e)\}$
31:          $A_b[A_h[h][r]] \leftarrow 1$
32:          }
33:          Add i to group h in array $A_h$
34:          }
35:          }
36:          reset $A_c$ array based on $A_d$
37:          reset only modified positions in count list $A_{cl}$
38:          }
39:          end

FIG. 10

| Initializing SCC filter. |
| --- |
| Input: $q_i$ query record. |
| Output: $A_c$ character array, $A_d$ address array, $n_c$ size of query alphabet. |

1:       begin
2:       $n_c \leftarrow 0$    // initialize size of query alphabet
3:       $for\ j \leftarrow 0, 1, ..., |q_i| - 1\ do$
4:       {
5:       $if\ (A_c[q_i[j]] = null)$
6:       { $A_c[q_i[j]].Q_c \leftarrow 1$
7:       $A_c[q_i[j]].R_c \leftarrow 0$
8:       $A_d[n_c] \leftarrow q_i[j]$   // store asci of char $q_i[j]$
9:       $n_c \leftarrow n_c + 1$
10:      }
11:      $else$
12:      $A_c[q_i[j]].Q_c \leftarrow A_c[q_i[j]].Q_c + 1$
13:      }
14:      end

FIG. 11

| Algorithm-3: Filter and verify a pair of records. |
|---|
| Input: $q_i, r_e, v_1, v_2, \eta, T, A_c, A_d, n_c$. |
| Output: *matched* // returns true if $q_i$ and $r_e$ pass filters and verification stages. |
| 1:      begin |
| 2:      $\breve{m} \leftarrow min(|q_i|, |r_e|)$ |
| 3:      $\hat{m} \leftarrow max(|q_i|, |r_e|)$ |
| 4:      $matched \leftarrow false$ |
| 5:      $if(\eta \geq \hat{m}v_1 - v_2)$ |
| 6:      $if(\breve{m}/\hat{m} \geq T)$ |
| 7:      $if(\text{Algorithm-4}(\breve{m}, \hat{m}, A_c, A_d, n_c, r_e) \geq T)$ |
| 8:      $if(verify(q_i, r_e))$ |
| 9:      $matched \leftarrow true$ |
| 10:      end |

FIG. 12

| SCC filter |
| --- |
| Input: $\tilde{m}, \hat{m}, A_c, A_d, n_c, r_e$. |
| Output: $\psi_{SCC}$ // computed record-level similarity. |

1:        begin
2:        $\xi \leftarrow 0$
3:        $for\ i \leftarrow 0, 1, \ldots, |r_e| - 1\ do$
4:        {
5:        $if(A_c[r_e[i]] \neq null)$
6:        $A_c[r_e[i]].R_c \leftarrow A_c[r_e[i]].R_c + 1$
7:        }
8:        $for\ i \leftarrow 0, 1, \ldots, n_c - 1\ do$
9:        {
10:      $if(A_c[A_d[i]].Q_c) < A_c[A_d[i]].R_c)$
11:      $\xi \leftarrow \xi + A_c[r_e[i]].Q_c$
12:      $else$
13:      $\xi \leftarrow \xi + A_c[r_e[i]].R_c$
14:      $A_c[r_e[i]].R_c \leftarrow 0$    // clear current count for next reference record
15:      }
16:      $\psi_{SCC} \leftarrow \xi \log \tilde{m} / \tilde{m} \log \hat{m}$
17:      end

Join times with different q-grams using TFS program on DBLP dataset.

Number of matched pairs discovered using TFS framework on DBLP dataset.

Number of matched pairs using Hungarian and Greedy methods on DBLP dataset with varying size of input records, similarity threshold T=0.90, and q-gram=3.

Join time per record pair discovered by similarity metrics on DBLP dataset

Join time per record pair discovered by similarity metrics on Query-Log dataset

Matched pairs in DBLP dataset detected by TFS program

Join time per discovered pair on DBLP dataset

Join time per discovered pair on Query-Log dataset

METHOD AND APPARATUS FOR IDENTIFYING SIMILAR DATA ELEMENTS USING STRING MATCHING

CROSS-REFERENCE TO RELATED APPLICATIONS

This application claims the benefit under 35 USC § 119(e) of US Provisional Application No. 63/292,721, filed on Dec. 22, 2021, in the US Patent Office, the entire disclosure of which are incorporated herein by reference for all purposes.

BACKGROUND

1. Field

The following description relates to methods and apparatuses for data processing to quickly and accurately determine if a given computer-readable record is represented, by exact match or pretty close match, from a collection of computer-readable records.

2. Description of Related Art

Fuzzy matching identifies two elements of text, strings, or entries that are approximately similar but are not exactly the same. Fuzzy string matching, also known as approximate string matching, is a search that finds matches even when users misspell words or enter only partial words for the search. Fuzzy matching has various application, for example, when a user types "Tenesse" into Google search engine, a list of hits is returned along with "Showing results for Tennessee". Thus, the search query returns results even if the user input contains additional or missing characters, or other types of spelling or translation error are present.

Fuzzy matching, however, presents some challenges. First, there is a challenge of fuzzy matching at scale. For example, if a bank has 9 million registered customers and an external transaction list with 2 million records that need to be matched with the current dataset, then they have 18 trillion record pairs. Even if a machine is used, this is an immense number of matches, which will take substantial memory and a large amount of time to obtain results. Second, different semantics of different languages presents challenges of matching names that are stored or translated/transliterated from one language to another. For example, a person's name may exist differently on multiple databases that are in different languages and with different spellings, which may happen when an Arabic name is transliterated into Latin letters. For example, Ahmed Iman Ali's is an Arabic name "أحمد إيمان علي," which may be transliterate and stored in English as any one or more of Ahmed Iman Ali, Ahmed Iman Aly, Ahmad Iman Ali, Ahmad Eman Ali, Ahmed Eman Ali, and Ahmat Eman Aly. Third, fuzzy matching suffers from high false positive rates. Thus, research is being conducted to address these and other problems related to fuzzy matching.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a processor-implemented method for identifying similar data records, the method including receiving a query, determining an index for the query, generating candidate records from a reference list to match the query based on the index and applying any one or any combination of a q-gram filter, a length filter, and a shared character count (SCC) filter, determining similarity scores $\mu_{SCC}(r_i, r_j)$ of each of the candidate records based on $$\sum_{1 \le u, l \le min(\|r_i\|, \|r_j\|)} \frac{d(t_{ui}, t_{lj})\log(\min(|t_{ui}|, |t_{lj}|))}{\min(|t_{ui}|, |t_{lj}|)\log(\max(|t_{ui}|, |t_{lj}|))}}{\min(\|r_i\|, \|r_j\|)},$$

wherein $\mu_{SCC}$ is a similarity score, $\|r_i\|$ is the number of tokens in record $r_i$, $\|r_j\|$ is the number of tokens in record $r_j$, $|t_{ui}|$ is the length of token u in record $r_i$, and $|t_{lj}|$ is the length of token l in record $r_j$, $\min(|t_{ui}|, |t_{lj}|)$ is the minimum length of token $t_{ui}$ and $t_{lj}$, and $\max(|t_{ui}|, |t_{lj}|)$ is the maximum length of token $t_{ui}$ and $t_{lj}$, identifying records from among the candidate records having a similarity score $\mu_{SCC}(r_i, r_j)$ greater than or equal to a threshold, selecting data records similar to the query based on sorting the selected records according to respective similarity scores, and outputting one or more of the selected data records, wherein one of the records $r_i$ and $r_j$ comprises the query and the other of the records $r_i$ and $r_j$ comprises a record from among the candidate records.

The generating of the candidate records may include generating candidate records from the reference list to match the query based on applying the q-gram filter and the SCC filter.

The generating of the candidate records may include generating candidate records from the reference list to match the query based on sequentially applying the length filter, the q-gram filter, and the SCC filter.

The method may include preprocessing the query, in response to receiving the query, wherein the preprocessing of the query may include determining whether the query comprises non-English words, preparing the non-English words of the query for transliteration, in response to the query containing non-English words, transliterating the non-English words into English, processing the English words of the query, converting the English words to one of capital or small case, and outputting the preprocessed query.

The preparing of the non-English words for transliteration may include any one or any combination of normalization, tokenization, and diacritics processing.

The transliterating of the non-English words into English may include inputting the non-English words into a neural network trained to transliterate a language of the non-English words.

The determining of the index for the query may include determining whether a length of the query is greater than a length of a q-gram, constructing a hash token including a hash value for each of the tokens comprised in the query, in response to the length of the query being greater than the length of the q-gram, assigning an index to the hash token, in response to the hash token not having been previously indexed, and assigning the hash token to a cluster, in response to the hash token having been previously indexed, wherein the cluster includes a group of hash tokens having an existing index, and wherein the length of the q-gram comprises a minimum length of searchable string.

The determining of the reference list may include reading records from a data source, determining whether a length of a record from among the records is greater than a length of a q-gram, constructing a hash token including a hash value for each token comprised in the record, in response to the length of the record being greater than the length of the q-gram, assigning an index to the hash token, in response to the hash token not having been previously indexed, assigning the hash token to a cluster, in response to the hash token having been previously indexed, and accumulating the hash tokens for the respective records in the reference list, wherein the cluster includes a group of hash tokens having an existing index, and wherein the length of the q-gram comprises a minimum length of searchable string.

The hash value for the each token may be based on $h(x, k)=((x[k-2]<<2)-x[k-1]<<2)-x[k]$, wherein, x represents the each token, $x[k]$ is an ASCI value of character located at index k, and $h(x, k)$ is the hash value of a q-gram ending at index k.

The length of the q-gram may be provided by a user.

The length of the q-gram may be based on system requirements.

The SCC filter may be based on determining $$\psi_{SCC}(r_i, r_j) = \frac{\sum_{\forall c \in \bar{\Sigma}_{r_i \bowtie r_j}} \min(\delta(c, r_i), \delta(c, r_j)) \log(\min(|r_i|, |r_j|))}{\min(|r_i|, |r_j|) \log(\max(|r_i|, |r_j|))},$$

wherein $\psi_{SCC}$ is a record-level similarity score between the records $r_i$ and $r_j$, $\bar{\Sigma}_{r_i \bowtie r_j}$ is a set of characters common between the records $r_i$ and $r_j$, $\delta(c, r_i)$ is an occurrence of character c in the record $r_i$, $\delta(c, r_j)$ is an occurrences of character c in the record $r_j$, $\min(|r_i|, |r_j|)$ is the minimum length of the record $r_i$ and $r_j$, and $\max(|r_i|, |r_j|)$ is the maximum length of the record $r_i$ and $r_j$, wherein one of the records $r_i$ and $r_j$ comprises the query and the other of the records $r_i$ and $r_j$ comprises a record from the reference list.

The q-gram filter may be based on $\rho=\hat{m}(1-q+qT)-(q-1)$, wherein $\rho$ is a lower bound quorum, q is a length of a q-gram, $\hat{m}$ is a maximum length of the record, and T is a similarity threshold.

The length filter may be based on $\check{m} \geq \hat{m}T$, where $\check{m}$ is a minimum length of a record from among the candidate records, $\hat{m}$ is a maximum length of the record, and T is a similarity threshold.

In another general aspect, there is provided an apparatus for identifying similar data records, the apparatus including a non-transitory computer-readable storage medium configured to store instructions and a reference list, and one or more processors executing the instructions to configure the one or more processors to receive a query, determine an index for the query, generate candidate records from the reference list to match the query based on the index and any one or any combination of a q-gram filter, a length filter, and a shared character count (SCC) filter, determining similarity scores $\mu_{SCC}(r_i, r_j)$ of each of the candidate records based on $$\frac{\sum_{1 \leq u, l \leq \min(\|r_i\|, \|r_j\|)} \frac{d(t_{ui}, t_{lj}) \log(\min(|t_{ui}|, |t_{lj}|))}{\min(|t_{ui}|, |t_{lj}|) \log(\max(|t_{ui}|, |t_{lj}|))}}{\min(\|r_i\|, \|r_j\|)},$$

wherein $\mu_{SCC}$ is a similarity score, $\|r_i\|$ is the number of tokens in record $r_i$, $\|r_j\|$ is the number of tokens in record $r_j$, $|t_{ui}|$ is the length of token u in record $r_i$, and $|t_{lj}|$ is the length of token l in record $r_j$, $\min(|t_{ui}|, |t_{lj}|)$ is the minimum length of token $t_{ui}$ and $t_{lj}$, and $\max(|t_{ui}|, |t_{lj}|)$ is the maximum length of token $t_{ui}$ and $t_{lj}$, identifying records from among the candidate records having a similarity score $\mu_{SCC}(r_i, r_j)$ greater than or equal to a threshold, selecting data records similar to the query based on sorting the selected records according to respective similarity scores, and outputting one or more of the selected data records, wherein one of the records $r_i$ and $r_j$ comprises the query and the other of the records $r_i$ and $r_j$ comprises a record from among the candidate records.

The one or more processors may be configured to determine whether a length of the query is greater than a length of a q-gram, construct a hash token including a hash value for each of the tokens comprised in the query, in response to the length of the query being greater than the length of the q-gram, assign an index to the hash token, in response to the hash token not having been previously indexed, and assign the hash token to a cluster, in response to the hash token having been previously indexed, wherein the cluster comprises a group of hash tokens having an existing index, and wherein the length of the q-gram comprises a minimum length of searchable string.

The one or more processors may be configured to read records from a data source stored in the non-transitory computer-readable storage medium, determine whether a length of a record from among the records is greater than a length of a q-gram, construct a hash token including a hash value for each token comprised in the record, in response to the length of the record being greater than the length of the q-gram, assign an index to the hash token, in response to the hash token not having been previously indexed, assign the hash token to a cluster, in response to the hash token having been previously indexed, and accumulate the hash tokens for the respective records in the reference list, wherein the cluster comprises a group of hash tokens having an existing index, and wherein the length of the q-gram comprises a minimum length of searchable string.

The apparatus of claim 17, wherein the hash value for the each token may be based on $h(x, k)=((x[k-2]<<2)-x[k-1]<<2)-x[k]$, wherein, x represents the each token, $x[k]$ is an ASCI value of character located at index k, and $h(x, k)$ is the hash value of a q-gram ending at index k.

20. The SCC filter may be based on determining $$\psi_{SCC}(r_i, r_j) = \frac{\sum_{\forall c \in \bar{\Sigma}_{r_i \bowtie r_j}} \min(\delta(c, r_i), \delta(c, r_j)) \log(\min(|r_i|, |r_j|))}{\min(|r_i|, |r_j|) \log(\max(|r_i|, |r_j|))},$$

wherein $\psi_{SCC}$ is a record-level similarity score between the records $r_i$ and $r_j$, $\bar{\Sigma}_{r_i \bowtie r_j}$ is a set of characters common between the records $r_i$ and $r_j$, $\delta(c, r_i)$ is an occurrence of character c in the record $r_i$, $\delta(c, r_j)$ is an occurrences of character c in the record $r_j$, $\min(|r_i|, |r_j|)$ is the minimum length of the record $r_i$ and $r_j$, and $\max(|r_i|, |r_j|)$ is the maximum length of the record $r_i$ and $r_j$, wherein one of the records $r_i$ and $r_j$ includes the query and the other of the records $r_i$ and $r_j$ comprises a record from the reference list.

The q-gram filter may be based on $\rho=\hat{m}(1-q+qT)-(q-1)$, wherein $\rho$ is a lower bound quorum, q is a length of a q-gram, $\hat{m}$ is a maximum length of the record, and T is a similarity threshold.

The length filter may be based on $\acute{m} \geq \acute{m}T$, where $\acute{m}$ is a minimum length of a record from among the candidate records, $\acute{m}$ is a maximum length of the record, and T is a similarity threshold.

Other features and aspects will be apparent from the following detailed description, the drawings, and the claims.

BRIEF DESCRIPTION OF DRAWINGS

FIGS. 9-12 illustrate examples of algorithms for the method for identifying similar data elements.

Figure 1:
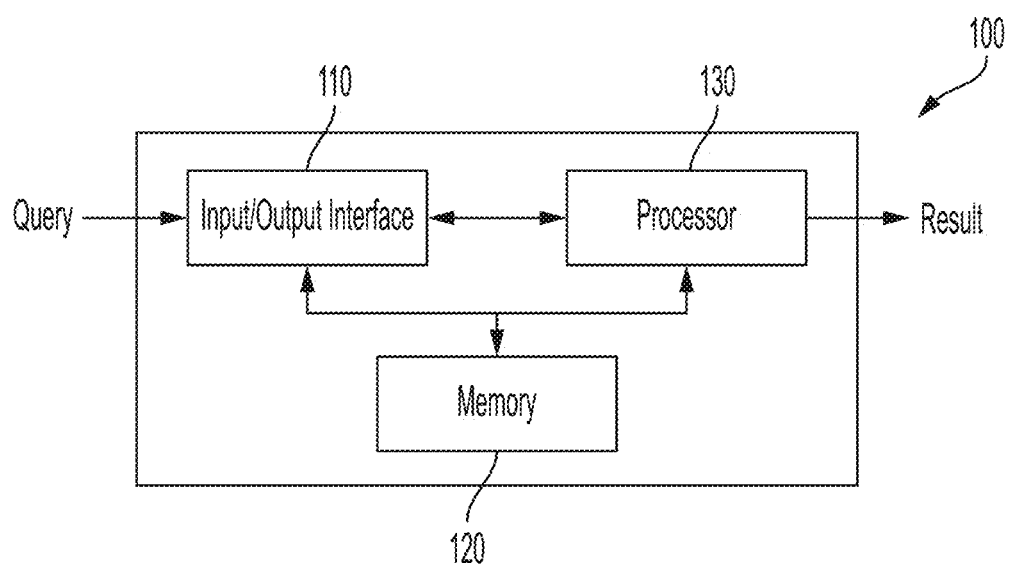
FIG. 1 illustrates an example of an apparatus for identifying similar data elements.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular example embodiments only and is not to be limiting of the example embodiments. The singular forms "a", "an", and "the" are intended to include the plural forms as well, unless the context clearly indicates otherwise. As used herein, the term "and/or" includes any one and any combination of any two or more of the associated listed items. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Although terms such as "first," "second," and "third", A, B, C, (a), (b), (c), or the like may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

It should be noted that if it is described in the specification that one component is "connected," "coupled," "attached," or "joined" to another component, a third component may be "connected," "coupled," and "joined" between the first and second components, although the first component may be directly connected, coupled or joined to the second component. In addition, it should be noted that if it is described in the specification that one component is "directly connected" or "directly joined" to another component, a third component may not be present therebetween. Likewise, expressions, for example, "between" and "immediately between" and "adjacent to" and "immediately adjacent to" may also be construed as described in the foregoing.

When describing the example embodiments with reference to the accompanying drawings, like reference numerals refer to like constituent elements and a repeated description related thereto will be omitted. In the description of example embodiments, detailed description of well-known related structures or functions will be omitted when it is deemed that such description will cause ambiguous interpretation of the present disclosure.

The use of the term "may" herein with respect to an example or embodiment (e.g., as to what an example or embodiment may include or implement) means that at least one example or embodiment exists where such a feature is included or implemented, while all examples are not limited thereto.

The same name may be used to describe an element included in the example embodiments described above and an element having a common function. Unless otherwise mentioned, the descriptions on the example embodiments may be applicable to the following example embodiments and thus, duplicated descriptions will be omitted for conciseness.

For the following disclosure it is assumed that $\acute{t}$ may be a substring or a token over a finite alphabet $\Sigma$ and $\acute{t} \in \Sigma^*$, where $\Sigma^*$ may be the set of all possible combinatorial substrings over $\sigma$ including the empty substring $\varepsilon$. The size of alphabet may be denoted by $|\Sigma|$ and the length of substring $\acute{t}$ may be denoted by $|\acute{t}|$. Similarly, it may be assumed that $\acute{r}$ may be a string or a record over a finite alphabet $\bar{\Sigma} = \Sigma \cup \{\ddot{w}\}$ such that $\acute{r} \in \bar{\Sigma}^*$, where $\ddot{w}$ may be the whitespace symbol and $\bar{\Sigma}^*$ may be the set of all strings over $\bar{\Sigma}$ including the empty string $\varepsilon$. Identifying strings that share similar meaningful substrings in a set of strings may include capturing similar string is tokenizing records into tokens that are separated by ẅ. When a set of contiguous ẅ occur in a string, only one ẅ may be considered. In the following description, the word record may to refer the string and the word token may refer to the substring.

In an example, let us assume that a record includes the following information "Muhammad Al-Qurishi, (Member, IEEE), Research and Innovation Division, Research Department, Elm Company, Riyadh 12382, Saudi Arabia," which is received from a publication database. Based on this example, the following terms may be defined for the present description.

A "token" may be a string of adjoining characters between space or punctuations. In an example, the string may be a number or time or date. From the above example "Muhammad" is a token, "IEEE" is also a token, and "12382" is also a token. A "token-level" may mean that each token may be processed and examined individually.

A "string" may be a sequence of characters, for example ", Riyadh 12382, Saudi Arabia" may be a string. A token may be a string, and a string may contain one or more tokens. A "sub-string" may be a part of a string it might be also a token but not always, for example, "Riya" is a substring. A "character" may be a single alphabet letter or a number.

A "query" could be a full record such as our general example above which contains multiple information about a person, or it could be list of records for multiple people, or it could be part of a record or even one token. The query may depends on the use case of the search that is being conducted.

A "record" may be a collection of information and it could contains several tokens and strings such as the example above. A "record-level" may mean that each record will be processed and examined individually. A "reference records" may be a list of records that may be extracted from the data sources and are processed only once so that they are searchable.

A "q-gram" may be a string of length q, which is further described below.

Referring to FIG. 1, an apparatus for identifying similar data elements 100 may perform fuzzy matching. In an example, the apparatus for identifying similar data elements 100 includes an input/output interface 110 and a processor 130. The apparatus for identifying similar data elements 100 may further include a memory 120. The apparatuses for identifying similar data elements 100 may receive input data, such as, for example, text, voice, or image data. The apparatus for identifying similar data elements 100 facilitates correlation of seemingly distant elements within data records while considering similarity on the element level as well as record level, thus, facilitating more efficient data processing and pruning procedures. As illustrated in FIG. 1, the apparatus for identifying similar data elements 100 may prepare, index, select candidate pair, and verify a query that is received to provide a result of fuzzy matching.

In an example, the apparatus for identifying similar data elements 100 may be implemented in the form of a chip and mounted on a hardware. In addition, the apparatus for identifying similar data elements 100 may be implemented in a personal computer (PC), a data server, a mobile device, a home appliance such as a television, a digital television (DTV), a smart television, a refrigerator, a smart home device, a vehicle such as a smart vehicle, an autonomous vehicle, an Internet of Things (IoT) device, a security kiosk, or a portable device.

The portable device may be implemented as a laptop computer, a mobile phone, a smart phone, a tablet PC, a mobile internet device (MID), a personal digital assistant (PDA), an enterprise digital assistant (EDA), a digital still camera, a digital video camera, a portable multimedia player (PMP), a speaker, a personal navigation device or portable navigation device (PND), a handheld game console, an e-book, or a smart device. The smart device may be implemented as a smart watch, a smart band, or a smart ring.

The input/output interface 110 may include a receiving interface. The input/output interface 110 may receive any one or any combination of text, voice, or image data. The input/output interface 110 may output the received text, voice, or image data to the processor 130. In an example, the input/output interface 110 may output a result of the query to a display or an external processor or system. In an example, the input/output interface 110 may output a result of the query including records that are sorted based on similarity scores to a display or an external processor or system.

The processor 130 may search a variety of data sources. The processor 130 may preprocess, prepare and build-up the query for further processing and performing fuzzy matching. The processor 130 may index and group the query to determine which indexes the query is directed to and to identify the group to which the query belong. The processor 130 may identify and filter candidate pairs to match the query. The processor 130 may verify the candidate pairs and sort the actual matches according to their similarity score using algorithms, such as, for example, the Hungarian algorithm and the Greedy algorithm. However, other algorithms are considered to be well within the scope of the present disclosure.

The "processor 130" may be a data processing device implemented by hardware including a circuit having a physical structure to perform desired operations. For example, the desired operations may include code or instructions included in a program. In an example, as at least a part of data processing or operations, the processor 130 may store instructions or data in the memory 120, execute the instructions and/or process data stored in the memory 120, and store resulting data obtained therefrom in the memory 120

For example, the hardware-implemented data processing device may include a microprocessor, a single processor, an independent processors, a parallel processors, a single-instruction single-data (SISD) multiprocessing, a single-instruction multiple-data (SIMD) multiprocessing, a multiple-instruction single-data (MISD) multiprocessing, a multiple-instruction multiple-data (MIMD) multiprocessing, a microcomputer, a processor core, a multi-core processor, a multiprocessor, a central processing unit (CPU), a neural processing unit (NPU), a graphics processing unit (GPU), a tensor processing unit (TPU), a digital signal processor (DSP), a controller and an arithmetic logic unit (ALU), a field-programmable gate array (FPGA), an application-specific integrated circuit (ASIC), a programmable logic unit (PLU), or an application processor (AP).

The processor 130 may process data stored in the memory 120. The processor 130 may execute a computer-readable code (for example, software) stored in the memory 120 and instructions triggered by the processor 130.

The memory 120 stores instructions (or programs) executable by the processor 130. For example, the instructions include instructions to perform an operation of the processor 130 and/or an operation of each element of the processor 130.

The memory 120 may be implemented as a volatile memory device or a non-volatile memory device.

The volatile memory device may be implemented as a dynamic random-access memory (DRAM), a static random-access memory (SRAM), a thyristor RAM (T-RAM), a zero capacitor RAM (Z-RAM), or a twin transistor RAM (TTRAM).

The non-volatile memory device may be implemented as an electrically erasable programmable read-only memory (EEPROM), a flash memory, a magnetic RAM (MRAM), a spin-transfer torque (STT)-MRAM, a conductive bridging RAM(CBRAM), a ferroelectric RAM (FeRAM), a phase change RAM (PRAM), a resistive RAM (RRAM), a nanotube RRAM, a polymer RAM (PoRAM), a nano floating gate Memory (NFGM), a holographic memory, a molecular electronic memory device), or an insulator resistance change memory.

Figure 2:
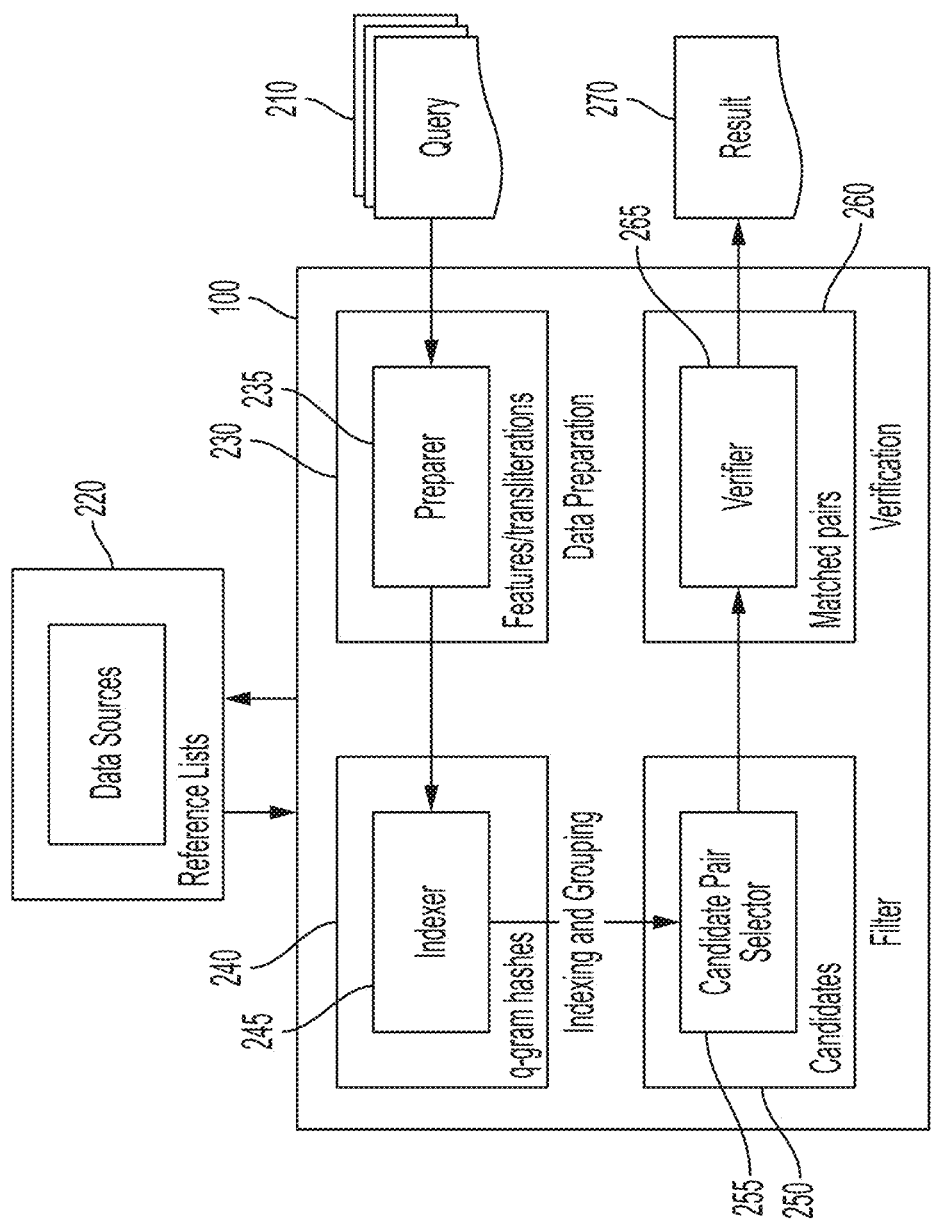
FIG. 2 illustrates an example of a method for identifying similar data elements.

FIG. 2 illustrates an example of a method for identifying similar data elements 200. FIG. 2 illustrates a method for measuring distances between database records and to fit the results into a wider framework capable of evaluating very large databases quickly and effectively. The method illustrated in FIG. 2 facilitates correlation of seemingly distant elements within data records while considering similarity on the element level as well as record level, thus, facilitating more efficient data processing and pruning procedures. As illustrated in FIG. 2, the operations of preparing 230, indexing 240, selecting candidate pair 250, and verification 260 may be performed by a processor (e.g., the processor 130 of FIG. 1) in an integrated manner to receive a query 210 and to provide a result of the processing 270.

The operations in FIG. 2 may be performed in the sequence and manner as shown, although the order of some operations may be changed or some of the operations omitted without departing from the spirit and scope of the illustrative examples described. Many of the operations shown in FIG. 2 may be performed in parallel or concurrently. One or more blocks of FIG. 2, and combinations of the blocks, can be implemented by special purpose hardware-based computer, such as a processor, that perform the specified functions, or combinations of special purpose hardware and computer instructions. In addition to the description of FIG. 2 below, the descriptions of FIG. 1 are also applicable to FIG. 2, and are incorporated herein by reference. Thus, the above description may not be repeated here.

In operation 210, a query may be entered by the user to the input/output interface 110. In another example, the query may be transmitted by an external component, interface, or system to the input/output interface 110. The query may be a voice, text, or image data. In an example, the voice query is converted into textual data for further processing. In an example, the translation is performed using an artificial intelligence model for translation.

The query may take a variety of forms. In an example, a search may be made of the entire record based on first name, second and last name, date of birth, place of birth, nationality, and other information. In another example, a search may be made by a portion of record, such as last name, first name, or any combination thereof. In yet another example, a search for a list may be made that contains complete or incomplete records. This list may be very long, such as a list of daily transactions, a list of people contacted during the week, a list of places visited during the week, or it may be a group of records.

In operation 220, the processor 130 may search a variety of data sources, such as, for example, company or organization databases, watch lists, commercial and marketing databases, and governmental records. These sources may contain information in a variety of languages, such as, for example Arabic, Urdu, French, Swahili, and English.

In operation 230, the processor 130 or the preparer 235 may preprocess, prepare and build-up the query for operation 240, i.e., indexing. Several process may be performed at this stage, such as, for example, normalizations of non-English words, e.g. Arabic, words, removing special character, removing stop words, tokenization, and transliteration.

In operation 240, the processor 130 or the indexer 245 may index and group to determine which indexes the query is directed to and to identify the group to which the query belong. In operation 250, the processor 130 or the candidate pair selector 255 may identify and filter candidate pairs to match the query. In operation 260, the processor 130 or the verifier 265 may verify the candidate pairs and sort the actual matches according to their similarity score using algorithms, such as, for example, the Hungarian algorithm and the Greedy algorithm. The illustrative examples described are not limited to the Hungarian algorithm and the Greedy algorithm, and other algorithms may be used without deviating from the spirit and scope of the illustrative examples described. In an example, the user or the generator of the query may choose the algorithm to use.

In operation 270, the processor 130 may provide results of matched records to the user or the external system/interface according to the similarity match score through the input/output interface 110. In an example, the processor 130 may provide a matched record having the highest similarity match score to the user or the external system/interface through the input/output interface 110. In another example, the processor 130 may provide the matched records having similarity match scores greater than a threshold to the user or the external system/interface through the input/output interface 110. FIG. 9 illustrates an example of a method for identifying similar data elements 200.

FIG. 10 illustrates an example of a method for string-matching. In the example of FIG. 10, inputs such as records file, similarity threshold (T), q-gram, maximum q-gram frequency (f), and the verification method are selected. In the example of FIG. 9, the method may start with initializing two main arrays $A_h$ and $A_c$, which may read a record from the input file and reset the bit array of size of the database record with bit 0. In an example, array $A_c$ may be a list of group character indexes. In an example, array $A_h$ may be a list of group hash indexes. In an example, the method of FIG. 9 may then call the algorithm described in FIG. 10 to initialize and build the data structure of the shared character filter and also store the results in $A_c$ and $A_d$. In an example, $A_d$ may be a list of address array of the q gram location in the record.

In an example, the hash function may be built and the index may be added to the array of indexes $A_h$. In an example, the method illustrated in FIG. 11 may be called to filter and verify the candidate pair of records. The matches may be stored in a list of similar pairs (∽), the matched results list. In an example, the results may be displayed to the user in ascending order according to the similarity match score.

Figure 3:
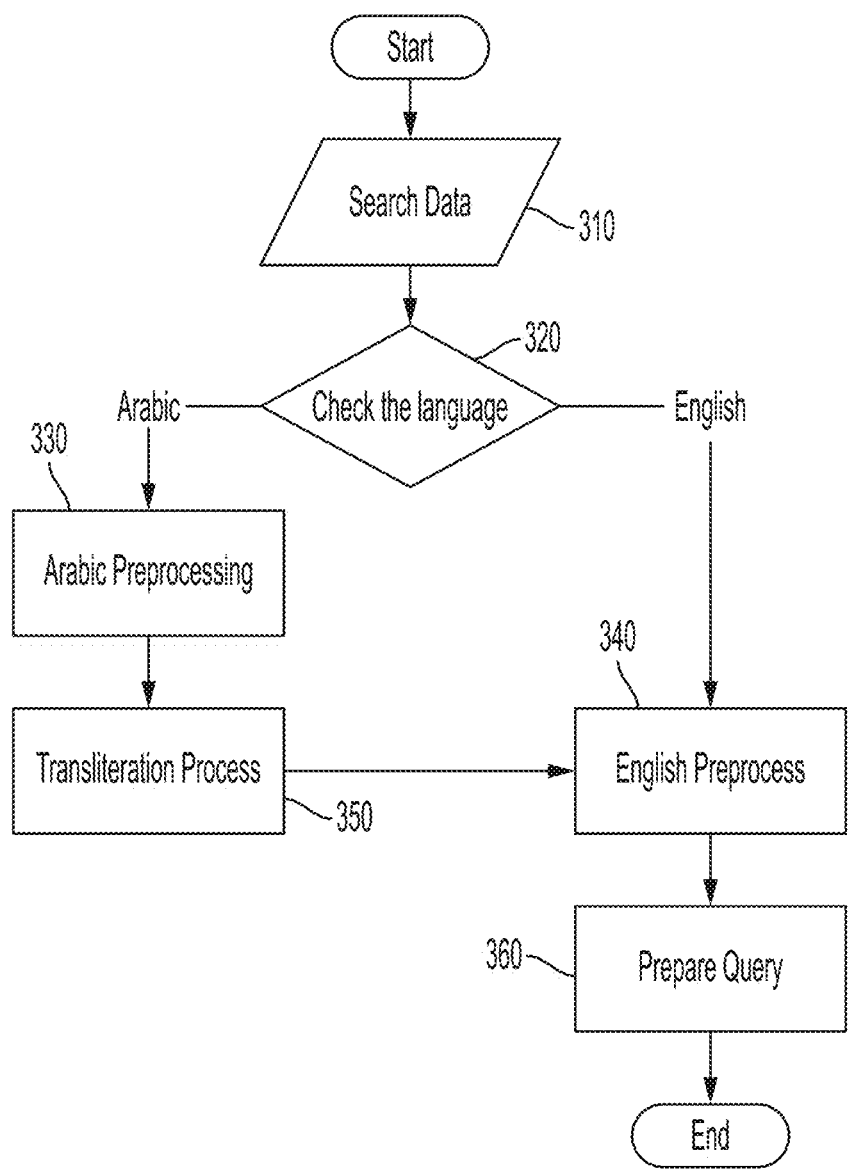
FIG. 3 illustrates an example of a method for query formulation.

FIG. 3 illustrates an example of a method for query formulation. The operations in FIG. 3 may be performed in the sequence and manner as shown, although the order of some operations may be changed or some of the operations omitted without departing from the spirit and scope of the illustrative examples described. Many of the operations shown in FIG. 3 may be performed in parallel or concurrently. One or more blocks of FIG. 3, and combinations of the blocks, can be implemented by special purpose hardware-based computer, such as a processor, that perform the specified functions, or combinations of special purpose hardware and computer instructions. In addition to the description of FIG. 3 below, the descriptions of FIGS. 1-2 are also applicable to FIG. 3, and are incorporated herein by reference. Thus, the above description may not be repeated here.

Referring to FIG. 3, in operation 310, a query may be entered by the user or transmitted by an external component, interface, or system. The query may take a variety of forms. In an example, it may be desired to search the entire record based on first name, second and last name, date of birth, place of birth, nationality, and other information. In another example, it may be desired to search by a portion of record, such as last name, first name, or any combination thereof. In yet another example, it may be desired to search for a list that may contain complete or incomplete records. This list may be very long, such as a list of daily transactions, a list of people contact6ed during the week, a list of places visited during the week, or it may be a group of records.

In operation 320, a processor, for example, the processor 130 of FIG. 1, may determine whether the language of the query is English or another language. In an example, if the query language is Arabic, transliteration process may be performed, else the query may proceed to preprocessing. In an example, if the language is other than English, such as Arabic, the method proceeds to operation 230. In an example, if the language is English, the method proceeds to operation 340.

In operation 330, the processor 130 may perform the processing of words that are not in the English language. For example, if the query is in Arabic, preprocessing of Arabic words, i.e., normalization, tokenization, and diacritics process may be carried out. In phonetics, a diacritical mark is a glyph or symbol, which is added to a letter that alters its sense, function, or pronunciation. In operation 330, the processor 130 may identify the diacritical mark and its import. In operation 350, the processor 130 may transliterate the non-English text into Latin letters. For example, the processor 130 may transliterate the Arabic text into Latin letters. In an example, the transliteration may be performed using a neural network to process the language and to convert the non-English text, such as Arabic text.

The neural network or an artificial neural network (ANN) may generate mapping between input patterns and output patterns, and may have a generalization capability to generate a relatively correct output with respect to an input pattern that has not been used for training. The neural network may refer to a general model that has an ability to solve a problem, where nodes form the network through synaptic combinations change a connection strength of synapses through training.

The neural network may be a model with a machine learning structure designed to extract feature data from input data and to provide an inference operation based on the feature data. The feature data may be data associated with a feature obtained by abstracting input data. If input data is a voice data, feature data may be data obtained by abstracting the voice data and may be represented in a form of, for example, a vector. The neural network may map input data and output data that are in a nonlinear relationship based on deep learning, to perform inference operation. The deep learning, which is a machine learning method used for tasks such as speech recognition, speech translation, or speech transliteration from a big data set, may map input data and output data to each other through supervised and/or unsupervised learning.

The inference operation may include, for example, sequence recognition, such as, for example, speech, gesture, and written text recognition, machine translation, machine interpretation, machine transliteration etc.

The neural network may include a deep neural network (DNN) including a plurality of layers and may be simply referred to as a neural network. The plurality of layers may include an input layer, hidden layers, and an output layer. The neural network may include a convolutional neural network (CNN), a recurrent neural network (RNN), a perceptron, a feed forward (FF), a radial basis network (RBF), a deep feed forward (DFF), a long short-term memory (LSTM), a gated recurrent unit (GRU), an auto encoder (AE), a variational auto encoder (VAE), a denoising auto encoder (DAE), a sparse auto encoder (SAE), a Markov chain (MC), a Hopfield network (HN), a Boltzmann machine (BM), a restricted Boltzmann machine (RBM), a deep belief network (DBN), a deep convolutional network (DCN), a deconvolutional network (DN), a deep convolutional inverse graphics network (DCIGN), a generative adversarial network (GAN), a liquid state machine (LSM), an extreme learning machine (ELM), an echo state network (ESN), a deep residual network (DRN), a differentiable neural computer (DNC), a neural turning machine (NTM), a capsule network (CN), a Kohonen network (KN), and an attention network (AN). In an example, at least a portion of the plurality of layers in the neural network may correspond to the CNN, and another portion thereof may correspond to the FCN. In this case, the CNN may be referred to as convolutional layers, and the FCN may be referred to as fully connected layers.

The processor 130 may read/write neural network data, for example, text data, voice data, image data, feature map data, kernel data, etc., from/to the memory 120 and execute a neural network using the read/written data. When the neural network is executed, the processor 130 may repeatedly perform convolution operations between an input feature map and a kernel, in order to generate data with respect to an output feature map. Here, a number of operations of the convolution operation may be determined, depending on various factors, such as, for example, the number of channels of the input feature map, the number of channels of the kernel, a size of the input feature map, a size of the kernel, and a precision of a value. The neural network may be implemented as a complicated architecture, where the processor 130 performs the convolution operation with an operation count of up to hundreds of millions to tens of billions, and the frequency at which the processor 130 accesses the memory 120 for the convolution operations rapidly increases.

In operation 340, the processor 130 may preprocess the English words. In an example, a set of operations may be performed, such as, for example, removing stop-words, removing commas, brackets and parentheses, text tokenization, and normalization. In operation 360, the processor 130 may output the preprocessed query, which may be provided as an input to other processes described in FIG. 2.

As shown in FIG. 3, after the language check, the query may be built using text processing and query preparation. The text processing and query preparation may include one or more operations, such as, for example, removing stop-words, removing commas and brackets or parentheses, text tokenization, and normalization.

Figure 4:
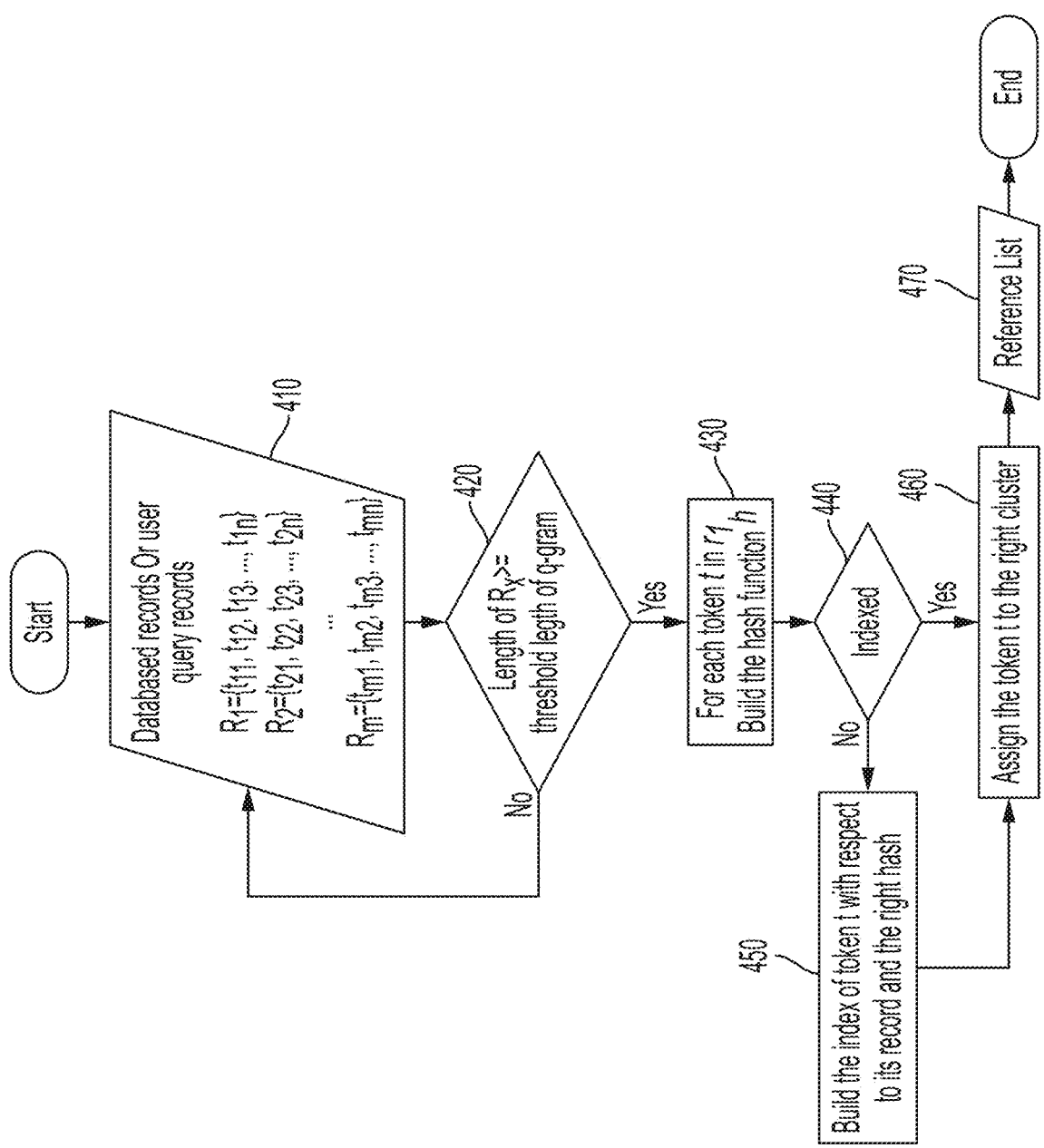
FIG. 4 illustrates an example of indexing components.

FIG. 4 illustrates an example of indexing. The operations in FIG. 4 may be performed in the sequence and manner as shown, although the order of some operations may be changed or some of the operations omitted without departing from the spirit and scope of the illustrative examples described. Many of the operations shown in FIG. 4 may be performed in parallel or concurrently. One or more blocks of FIG. 4, and combinations of the blocks, can be implemented by special purpose hardware-based computer, such as a processor, that perform the specified functions, or combinations of special purpose hardware and computer instructions. In addition to the description of FIG. 4 below, the descriptions of FIGS. 1-3 are also applicable to FIG. 4, and are incorporated herein by reference. Thus, the above description may not be repeated here.

Referring to FIG. 4, the indexing operation may be performed for both the query that is received and for generating the reference list from the records that are stored in the data source 220 of FIG. 2. The explanation below may be provided in the context of generating the reference list from the records that are stored in the data source 220, but they are equally applicable to the query 210 that is received. However, redundant description may be omitted for brevity.

In operation 410, records in the data sources shown in FIG. 2 as well as in the query "R" represents the name of the record and "t" is a word or token in R. In an example, a record may contain multiple words, which may contain multiple q-grams. In an example, a token may be a word or a collection of one or more characters. In an example, these data may be preprocessed by previous operations and prepared for the indexing process. In operation 420, a processor (e.g., the processor 130 of FIG. 1) may determine whether a length of the Record R is greater than or equal a threshold length. In an example, the processor 130 may determine whether a length of the Record R is greater than or equal to a length of a q-gram that is provided as a minimum limit of searchable string.

In an example, a q-gram may be a string of length q. In an example, q-grams may also be called k-mers, w-words, or k-tuples. In an example, q (or k, w, etc.) may be smaller than the strings that are is to be compared. In an example, q-grams may be fixed, and the number of occurrences of q-grams may be used to compute distances between strings. In an example, a length of the q-gram may be entered by the user as a minimum limit of searchable string. In another example, a length of the q-gram may be provided by an external system or interface as a minimum limit of searchable string.

If the length of the record $R_x$ is greater than a length of the q-gram, in operation 430, then the processor 130 may build a hash token, i.e., a hash value for each token t that is contained in the record R. In operation 440, it is determined whether the hash token has been previously indexed. If the hash token t has not been previously indexed, in operation 450, the processor 130 may assign an index to the hash token t. For each token t, the record Id and hash index for the token t may be recorded. If the hash token t has been previously indexed, in operation 460, the processor 130 may assign the hashed token t to the appropriate group or cluster of records. In an example, the cluster is a group of tokens that have a similar index. In operation 470, the generated reference list that is processed by the processor 130 may be ready for the search process. In an example, the reference list may be a list that is generated from the database one time, and the database would not need to be accessed in subsequent time intervals when access to the information in the database is needed. Instead, the needed information may be obtained from the reference list. The reference list may be used by a user when processing a query, and because the reference list is used, access to the database is not needed each time a query is to be processed. A search of the reference list may be conducted to retrieve the candidate records, and the database need not be accessed. The reference list may be a set of record that contains the candidate records. In an example, the candidate records are the records that are filtered to be the closest records matching the query.

In an example, the reference list may be obtained only once from the data sources 220. In an example, the data sources 220 may be a database containing customer information, such as the bank's database or other databases (may be multi-source or single-source). The reference list may be generated by applying indexing to the data in the data sources 220, where the hash and group records with respect to their q-gram hash may be generated. Thus, the database may be accessed only once for creating the reference list. In an example, the process of generating the reference list may be the same as is described above for the query that is received.

As shown in FIG. 4, the indexing process may be done in two parts, the first part may be performed on the database to produce the reference list. In an example, the reference list may be produced only once when the user wants to save the list for any future operations and may be updated as needed. In another example, the reference list may be online at the time of the query and may disappear thereafter. Thus, it is possible to efficiently manage huge amounts of data in a very small memory space. The second part is indexing the query, which may be performed online, and then selecting the appropriate groups to match with the query.

Figure 5:
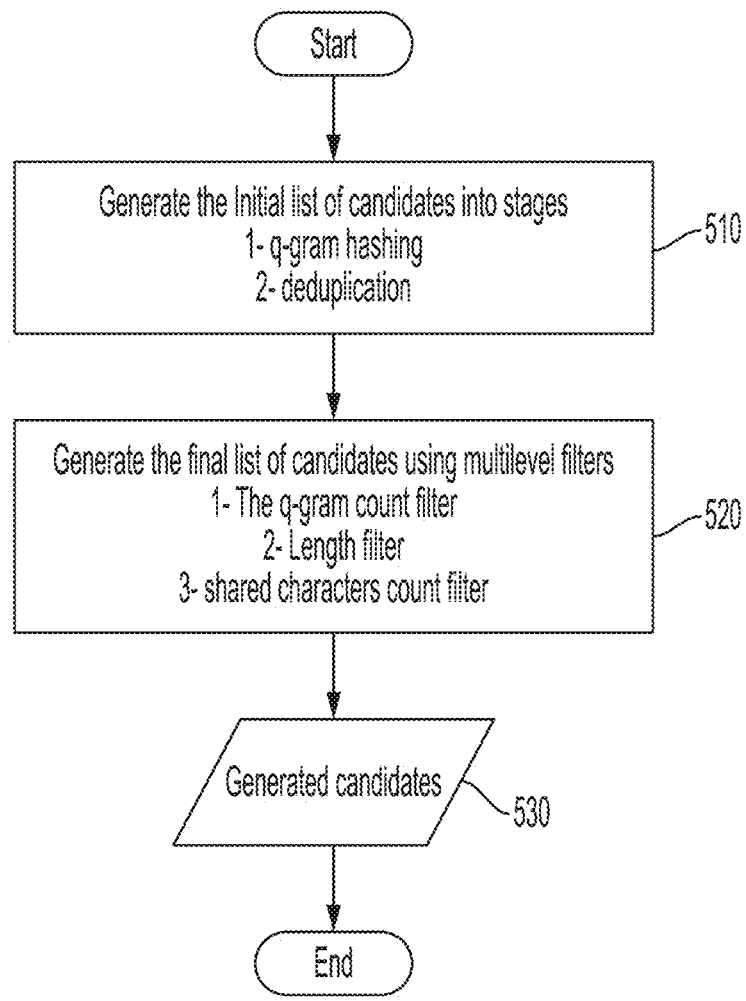
FIG. 5 illustrates an example of generating a list of candidates through grouping and filtering.

FIG. 5 illustrates an example of generating a list of candidate records through grouping and filtering. The operations in FIG. 5 may be performed in the sequence and manner as shown, although the order of some operations may be changed or some of the operations omitted without departing from the spirit and scope of the illustrative examples described. Many of the operations shown in FIG. 5 may be performed in parallel or concurrently. One or more blocks of FIG. 5, and combinations of the blocks, can be implemented by special purpose hardware-based computer, such as a processor, that perform the specified functions, or combinations of special purpose hardware and computer instructions. In addition to the description of FIG. 5 below, the descriptions of FIGS. 1-4 are also applicable to FIG. 5, and are incorporated herein by reference. Thus, the above description may not be repeated here.

Referring to FIG. 5, in operation 510, a processor (e.g., the processor 130 of FIG. 1) may perform q-gram hashing and deduplication. In an example, the processor 130 may generate the initial candidate list in two stages. In the first stage, the processor 130 may generate the initial candidate list using the q-gram hashing group. In the second stage, the processor 130 may perform deduplication to ensure that there is no duplication in the generated initial candidate list. Deduplication helps avoid revisiting a record that have been already checked, so that the search time is minimized time and search space is optimized. The deduplication is further explained with reference to operation 650 in FIG. 6A.

In operation 520, the processor 130 may use one or more of three different types of filters to generate the final candidate list. In an example, the processor 130 may use all three of the q-gram count filter, the length filter and the shared character count filter to generate the final candidate list. In an example, the processor 130 may use the q-gram count filter, and the length filter to generate the final candidate list. In another example, the processor 130 may use the q-gram count filter and the shared character count filter to generate the final candidate list. In another example, the processor 130 may use the length filter and the shared character count filter to generate the final candidate list. In an example, the processor 130 may sequentially use the q-gram count filter, the length filter and the shared character count filter to generate the final candidate list.

In operation 530, the processor 130 may generate a list of candidate records after hashing and filtering.

Figure 6A:
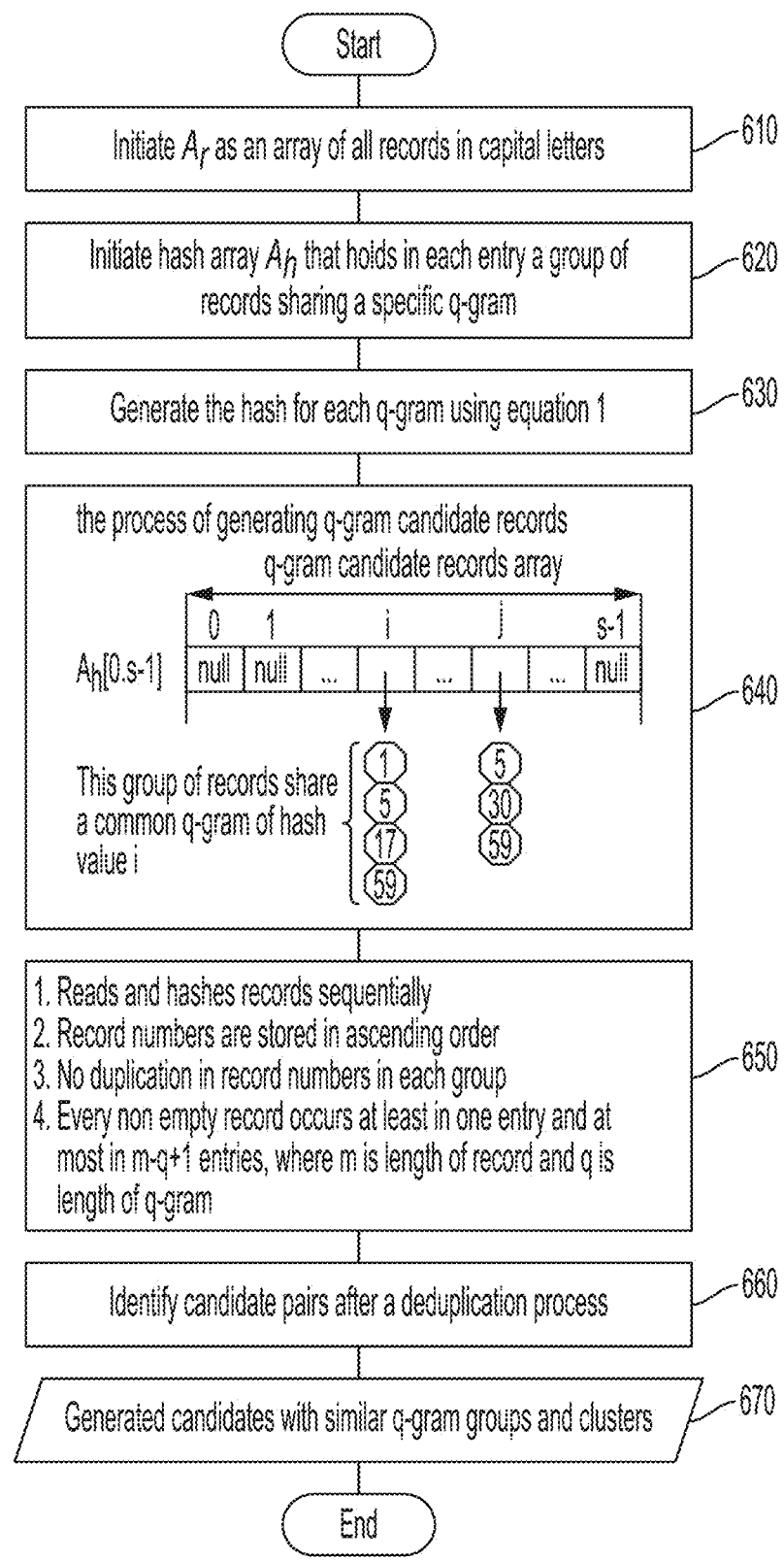
FIG. 6A illustrates an example of grouping records with common q-grams.

FIG. 6A illustrates an example of grouping records with common q-grams. The operations in FIG. 6A may be performed in the sequence and manner as shown, although the order of some operations may be changed or some of the operations omitted without departing from the spirit and scope of the illustrative examples described. Many of the operations shown in FIG. 6A may be performed in parallel or concurrently. One or more blocks of FIG. 6A, and combinations of the blocks, can be implemented by special purpose hardware-based computer, such as a processor, that perform the specified functions, or combinations of special purpose hardware and computer instructions. In addition to the description of FIG. 6A below, the descriptions of FIGS. 1-5 are also applicable to FIG. 6A, and are incorporated herein by reference. Thus, the above description may not be repeated here.

Referring to FIG. 6A, in operation 610, a processor (e.g., the processor 130 of FIG. 1) may initialize an array $A_r$, which is used to hold all records in capital letters so that difference between small and capital letters are eliminated. In another example, the array $A_r$ is used to hold all records in small letters so that difference between small and capital letters are eliminated. Since the whole string is converted to one of lower/uppercase letters, efficiencies are achieved because we do not have check for both the cases (uppercase and lowercase) to verify a match. Instead, a check of the string may be conducted in one case only. In an example, an array may be used to store all tokens in uppercase letter so that when using the q-gram hash we only need to do it for uppercase letters. When two records have the same q-gram, they may be called q-gram candidate. In an example, a pair of records are q-gram candidate if they share the same q-gram. This facilitates in identifying q-gram candidate pairs of records. Another hash array $A_h$ may be created to holds the index of each group of q-gram candidate, and when a search is conducted, only the index may be checked and not the content. The hash array $A_h$ may holds in each entry a group of records sharing a specific q-gram that has a hash value equals the index of that entry.

In operation 620, a hash array $A_h$ may be initialized that holds in each entry a group of records sharing a specific q-gram that has a hash value equal to the index of that entry. In an example, when the sequence of the q-gram is the same it may be put in a group and given a hash ID. The number of q-grams in the sequence may be the same, which may either be defined by a user or given in the settings. In an example, the length of the q-gram may be between 2 and 6.

In operation 630, the processor 130 may apply the hash function described in equation 1 below to generate the hash. For record x of length n, the q-gram function when q=3 may be as described in Equation 1. In an example, a hash may be generated for all incoming words in a query.

$$h(i,k)=((x[k-2]<<2)-x[k-1]<<2)-x[k] \quad \text{[Equation 1]}$$

Figure 6B:
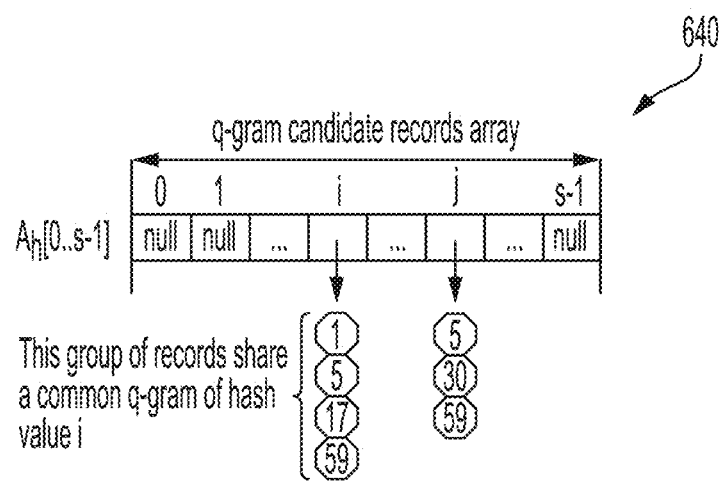
FIG. 6B illustrates an example of a process of generating q-gram candidate records.

In Equation 1, $k \in [2 \ldots n]$, record x may be represented as 0-indexed array and the x[k] may be an ASCI value of character located at index k. In an example, the returned hash value h(x, k) of the q-gram ending at index k may be within the bounds of array $A_h$, i.e., may not exceed the length of the array. In an example, the bounds of an array may mean being inside the range of that array, i.e., not less than one nor greater than the length of that array In operation 640, the processor 130 may generate q-gram candidate records. This may be used for de-duplication. As illustrated in FIG. 6B, records 1, 5, 17, and 59 share a q-gram that has the same hash value i and records 5, 30, and 59 also share another q-gram of hash value j. In an example, if a query fall in the hash "i", a comparison if this query may not be made again with "5" and "59" in hash "j" because a comparison of these records has already been made in hash "i" unless the query has a shared q-gram with record "30."

In operation 650, the processor 130 may read and hash the records sequentially, and the data structure may have the characteristics as shown in 640. In an example, the record numbers may be stored in ascending order, there may be no duplication in record numbers in each group, i.e., a group of records will not contain record numbers [1, 5, 17, 17, 59], instead, the records may be arranged as [1, 5, 17, 59]. In an example, each non-empty record may occur at least in one entry and at most in m−q+1 entries, where m is length of the record and q is length of the q-gram.

In an example, data structure may define a method of organizing and storing data in computers in such a way that operations may be performed on the stored data efficiently and effectively. In an example, the Shared character count ("SCC") filter may use a character array $A_c$ of size $2^{16}$. This size may be sufficient to index all two-byte characters. In another example, a list of addresses of the characters that appear in the query record being processed in an array $A_d$ may be stored in order to accelerate the access for the positions of characters. Thus, the combination of $A_c$ and $A_d$ together represents an example of a data structure used in the SCC filter. Another example of a data structure is an array $A_r$, which is used to stores all records in capital letters so that no difference occur between small and capital letters. Another example of a data structure used in the disclosure is hash array $A_h$, which is illustrated in FIG. 6B. FIG. 6B illustrates an example of a hash table or hash array $A_h$ array that stores q-gram candidate record arrays 0, 1 . . . i . . . j . . . s−1. Each of the records stored in each of the hash arrays have at least one common q-gram. Hash array $A_h$ stores in each entry, 0 to s−1, a group of records sharing a specific q-gram that has a hash value equal to the index of that entry.

In operation 660, the processor 130 may identify q-gram candidate pairs of q-gram records. From each group of records sharing one q-gram, several pairs may be created as candidates for similarity. As shown in FIG. 6B, the pair of records (5, 59) is repeated twice in groups i and j. To prevent such duplication, a bit array may be used. The size of the bit array may be equal to the number of records in the input file, which may be derived from the reference list. Since the records are processed in sequence, last record number in the corresponding group may be compared with the number of record being processed.

In an example, if two records are matched, a duplication is detected and the processor 130 may skip the entire group of records. In operation 670, if no match is detected, every record may be checked using the bit array whether it was previously verified with the current record or not. When the bit array indicates a previous selection, the record in that group may be neglected, else it may be considered as a candidate with the current record and may be filtered and verified. In an example, some q-grams frequently occur in many records, thus, the maximum size of each group may be managed as input parameter, Max_Q_Gram_Freq, to speed up the matching process.

With each query record, similar reference records may be verified with length filter, q-gram filter and then Shared-Char-Count. In an example, a bit array having a size equal to a number of reference records is used to mark each filtered reference record for first time. In an example, if the number of reference records are 10,000,000 records, about 1.2 MB of memory will be reserved for the bit array.

For all candidate pairs that pass the three filters are verified with Hungarian method or greedy method.

To speed up the verification stage, Max_Q_Gram_Freq threshold is used so that groups of reference records that share a q-gram but exceed the threshold are neglected. For example, user may set Max_Q_Gram_Freq=1000 which is more efficient than putting it=10,000 and so on. The greater the Max_Q_Gram_Freq the more processing time and space that is needed, but the results may be more accuracy. However, in an example, setting the Max_Q_Gram_Freq of about 1000 may produce an optimal balance of computational time, utilizing better memory space, and producing accurate results. To optimize the memory and computational power in an example, Max_Q_Gram_Freq of about 1000 may be used.

Figure 7A:
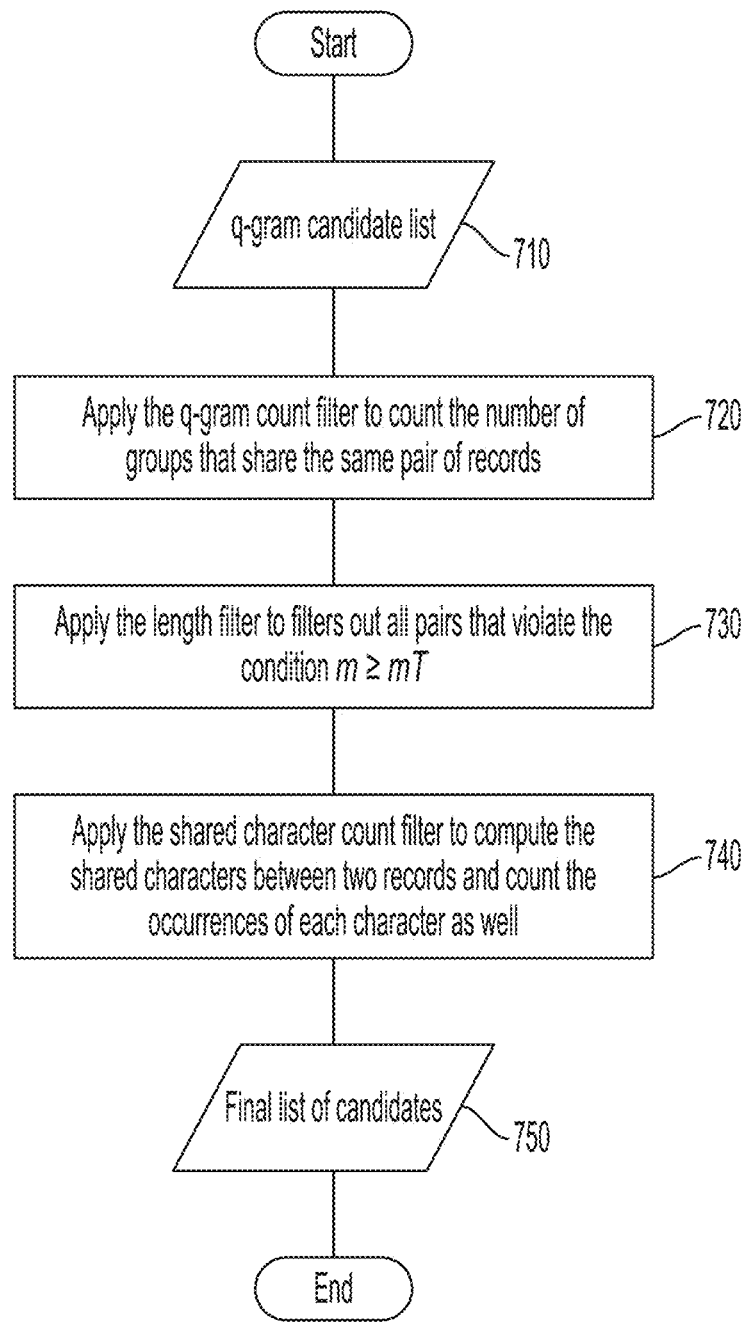
FIGS. 7A-7B illustrate an example of generating the final candidate list using three filters.

FIG. 7A illustrates an example of the operation of the process of generating the final candidate list using three filters. The operations in FIG. 7A may be performed in the sequence and manner as shown, although the order of some operations may be changed or some of the operations omitted without departing from the spirit and scope of the illustrative examples described. Many of the operations shown in FIG. 7A may be performed in parallel or concurrently. One or more blocks of FIG. 7A, and combinations of the blocks, can be implemented by special purpose hardware-based computer, such as a processor, that perform the specified functions, or combinations of special purpose hardware and computer instructions. In addition to the description of FIG. 7A below, the descriptions of FIGS. 1-6B are also applicable to FIG. 7A, and are incorporated herein by reference. Thus, the above description may not be repeated here.

Referring to FIG. 7A, in operation 710, an initial list of candidate records, which is previously generated, may be provided as an input to a processor (e.g., the processor 130 of FIG. 1). The initial list of candidate records may be generated as described in Step 670 of FIG. 6A.

In operation 720, the processor 130 may apply the q-gram filter to count the number of groups of records that share the same pair of records. In the pair of records, one record may belong to the query and another record may belong to the reference list. The threshold may apply for both the q-gram and the length of the record. In an example, the threshold is set by the user. In an example, the processor 130 may compute the lower bound quorum ρ, using Equation 2 below.

$$\rho = \hat{m}(1-q+qT)-(q-1) \quad \text{[Equation 2]}$$

In an example, the lower bound quorum p may be calculated for the number of groups that contain the same pair of records that may be sufficient to achieve a given similarity threshold T, where m̂ is the maximum length of the record. In an example, the similarity threshold T is set by the user. In an example, the two values (1−q−qT) and (q−1) may be computed in advance.

Assuming that all q-grams occurring in each record are unique, for a pair of records having the same length m and scoring the highest similarity score 1, the two records share (m−q+1) q-grams, where m is length of the record and q is length of the q-gram. In an example, when the distance between the two records is 1, then the similarity may be 1−1/m. Thus, the two records may share at least (m−q(1+1)+1) q-grams. In an example, when two records have different lengths and distance d, there are at least (m̂−q(1+d)+1) shared q-grams that achieve the similarity (1−d/m̂), where m̂ is the maximum length of the record. In an example, given a similarity threshold T, two records of maximum length m̂ pass q-gram count filter if the q-gram count is greater than the quorum p, which is computed by Equation 2. In an example, "d" is the distance between two tokens or two records, and it may be a distance such as, for example, normalized edit distant (ED), Dice (DS), Cosine (CS), Jaccard (JS), or Jaro-Winkler (JW).

In operation 730, the processor 130 may apply the length filter to filter out all pairs that violate the condition of m̌≥m̂T, where m̌ is the minimum length of the record, m̂ is the maximum length of the record, and T is a similarity threshold. In an example T is a value that is set in advance or is provided by the user. In an example, the length filter may compare the minimum length m̌ of two records to the maximum length m̂. This pruning step filters out all pairs that violate the condition of m̌≥m̂T.

In operation 740, the processor 130 may apply the shared character count filter (SCC filter) to compute the shared character between two records and to count the occurrence of each character. Thus, the shared characters are computed at the character level, which are even more granular than a comparison at the q-gram level. In an example, the data structure of the SCC filter may be initialized according to the algorithm disclosed in FIG. 10. FIG. 10 illustrates an example of initializing the data structure that represent the SCC filter. In the example of FIG. 10, the user selects query $q_i$. The SCC algorithm may take the query, hash it, and return three outputs. $A_c$ character array, $A_d$ address array, $n_c$ size of query alphabet, which will be inputs in the algorithm illustrated in FIG. 10.

In an example, the SCC filter computes the shared characters between two records and also counts the occurrences of each character as well. In an example, when records $r_i$ and $r_j$ are alphabets contained in a set containing alphabets, $\Sigma$, the alphabet of record $r_i$ may be denoted by $\Sigma_{r_i} \subseteq \Sigma$. In an example, the SCC filter may consider both alphabet content and length of the record at the same time. In an example, the similarity score $\psi_{SCC}$ between two records $r_i$ and $r_j$ may be computed as shown in Equation 3 below. The similarity score $\psi_{SCC}(r_i, r_j)$ in Equation 3 may also be referred to as Log Similarity Metric ("LSM").

$$\psi_{SCC}(r_i, r_j) = \frac{\Sigma_{\forall c \in \Sigma_{r_i} \bowtie r_j} \min(\delta(c, r_i), \delta(c, r_j)) \log(\min(|r_i|, |r_j|))}{\min(|r_i|, |r_j|) \log(\max(|r_i|, |r_j|))} \quad \text{[Equation 3]}$$

In Equation 3, $\psi_{SCC}$ may be the Record-level similarity score between two records $r_i$ and $r_j$. $\overline{\Sigma}_{r_i \bowtie r_j}$ may denote the set of characters that are common between records $r_i$ and $r_j$, or it may also denote the intersection of the alphabetic characters between the two records. The alphabetic characters are just an example, and the similarity may be calculated between any types of characters, such as, for example numeric characters, Arabic characters etc. Here, $\overline{\Sigma}_{r_i \bowtie r_j} = \Sigma_{r_i} \cap \Sigma_{r_j}$, and $\delta(c, r_i)$ is an occurrence of character c in record $r_i$, $\delta(c, r_j)$ is the occurrences of character c in record $r_j$, min($|r_i|$, $|r_j|$) is the minimum length of record $r_i$ and $r_j$, max($|r_i|$, $|r_j|$) is the maximum length of record $r_i$ and $r_j$. Based on the SCC filter, a pair of records is filtered out if it violates the condition, $\Sigma_{\forall c \in} \overline{\Sigma}_{r_i \bowtie r_j}{}_{min\ (\delta(c,\ ri),\ \delta(c,\ r_j))}$ log(min($|r_i|$, $|r_j|$))≥T min($|r_i|$, $|r_j|$) log(max($|r_i|$, $|r_j|$)).

An example of the SCC filter is described in the algorithm of FIG. 12. FIG. 12 illustrates an example of the filter method, which is the shared character count ("SCC"). In the example of FIG. 12, the verification algorithm takes multiple inputs from other algorithms and applies the SCC filter. The results of applying the shared character count filter may be a list of computed similarity in record-level and may be stored in $\psi_{SCC}$. In an example, the similarity may be computed in two levels, token level as well as record level.

Figure 7B:
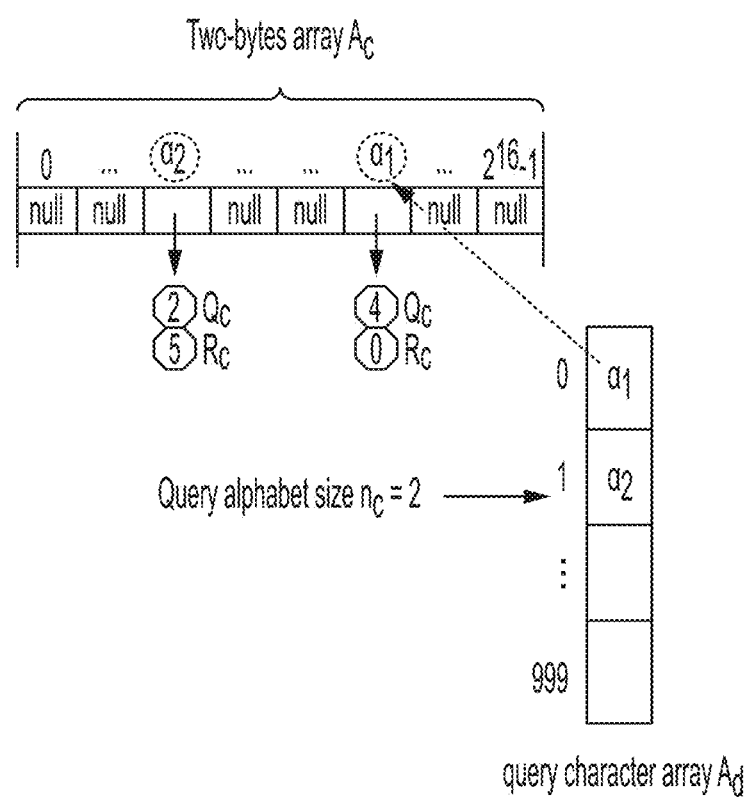

In an example, the SCC filter is implemented efficiently using a character array $A_c$ of size $2^{16}$. This size is sufficient to index all two-byte characters. An auxiliary array $A_d$ may be used to hold addresses of the characters present in the query record being processed in order to accelerate the access for the positions of the characters. In an example, if $r_i$ is the i-th record that is currently processed, $r_i$ is called as the query record and the previous records $r_0, r_1, \ldots, r_{i-1}$ are called the reference records. Every entry in the array $A_c$ holds two information, query character count $Q_c$ and reference character count $R_c$. The data structure in FIG. 7B illustrates an example of the mechanism of SCC filter. As shown in FIG. 7B, the query alphabet size $n_c=2$ and character $\alpha_1$ occurs 4 times in the query and does not occur in the reference record, while character $\alpha_2$ occurred 2 times in query and 5 times in reference. Thus, SCC=min(2,5)+min(4,0)=2. Assuming that the maximum length of the two records in the example is 6 and the similarity threshold T=0.9, then this pair of records has similarity $$\psi_{SCC}(\text{query, reference}) = \frac{2}{6} = 0.3$$

which is less than T. As a result, this pair may be filtered out.

In operation 750, the processor 130 may determine a final candidate list of records, which may be used as an input for other operations of the matching process.

Figure 8:
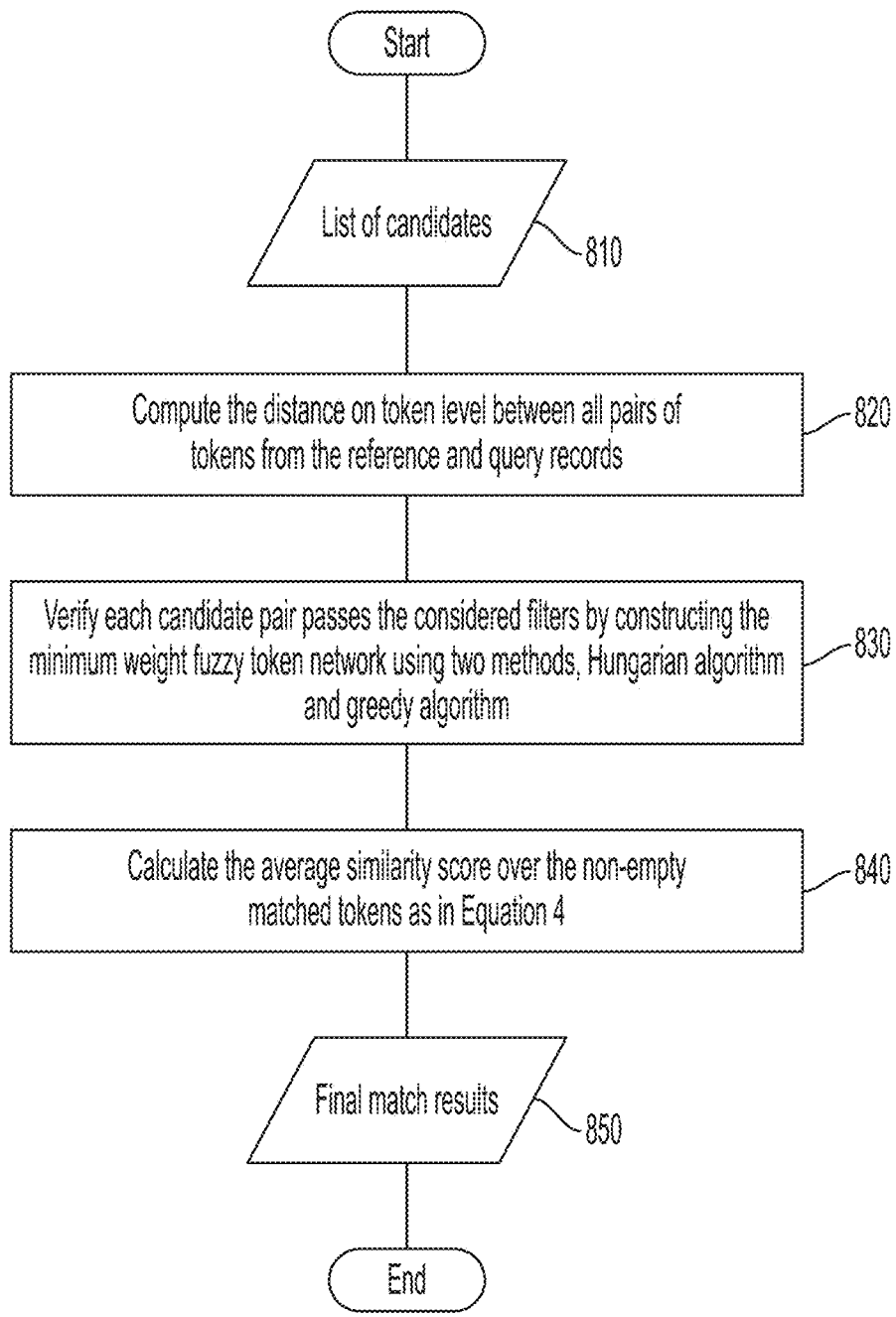
FIG. 8 illustrates an example of the verification process.

FIG. 8 illustrates an example of the operation of the process of generating the final candidate list using three filters. The operations in FIG. 8 may be performed in the sequence and manner as shown, although the order of some operations may be changed or some of the operations omitted without departing from the spirit and scope of the illustrative examples described. Many of the operations shown in FIG. 8 may be performed in parallel or concurrently. One or more blocks of FIG. 8, and combinations of the blocks, can be implemented by special purpose hardware-based computer, such as a processor, that perform the specified functions, or combinations of special purpose hardware and computer instructions. In addition to the description of FIG. 8 below, the descriptions of FIGS. 1-7B are also applicable to FIG. 8, and are incorporated herein by reference. Thus, the above description may not be repeated here.

Referring to FIG. 8, in operation 810, a final candidate list of records that has been generated in the previous operations of the filtering process may be used.

In operation 820, a processor (e.g., the processor 130 of FIG. 1) may compute the distance on token level between all pairs of tokens from the query and reference records. In an example, the processor 130 may compute the distance on token level between all pairs of tokens from the query and reference records. In an example, the distance between a pair of tokens ($t_i$, $t_j$) may be computed as $d(t_i, t_j)=1-\psi_{SCC}(t_i, t_j)$.

In operation 830, the processor 130 may verify whether each candidate pair passes the three considered filters, described above, by constructing the minimum weight fuzzy token network and traversing it for the optimal path. In an example, the minimum weight fuzzy token network may be traversed for the optimal path using methods, such as, for example, Hungarian algorithm and Greedy algorithm. In the Hungarian algorithm, the optimal token matching may be achieved with time complexity of $O(m^3)$, where m is the maximum number of tokens. In the Greedy algorithm near-optimal token matching may be achieved in time complexity of $O(m^2 \log_2 m)$.

FIG. 11 illustrates an example of an algorithm for filtering and verifying a pair of records. In the example of FIG. 12, the verification algorithm takes multiple inputs from the other algorithms and applies three different filter to filter out the pair of records that may not be considered as candidate match. The list of candidate records may be stored in the matched list for the final decision in the main algorithm.

In operation 840, the processor 130 may identify matched pair of tokens by the matching method, the average similarity, $\mu_{SCC}(r_i, r_j)$, is computed over the non-empty matched tokens as shown in Equation 4.

[Equation 4]

$$\mu_{SCC}(r_i, r_j) = 1 - \frac{\sum_{1 \le u, l \le min(\|r_i\|, \|r_j\|)} \frac{d(t_{ui}, t_{lj}) \log(\min(|t_{ui}|, |t_{lj}|))}{\min(|t_{ui}|, |t_{lj}|) \log(\max(|t_{ui}|, |t_{lj}|))}}{\min(\|r_i\|, \|r_j\|)},$$

In Equation 4, $\mu_{SCC}$ the token-level similarity score, $\|r_i\|$ is the number of tokens in record $r_i$, $\|r_j\|$ is the number of tokens in record $r_j$, $|t_{ui}|$ is the length of token u in record $r_i$, and $|t_{lj}|$ is the length of token l in record $r_j$, min($|t_{ui}|$, $|t_{lj}|$) is the minimum length of token $t_{ui}$ and $t_{lj}$, and max($|t_{ui}|$, $|t_{lj}|$) is the maximum length of token $t_{ui}$ and $t_{lj}$.

In an example, if the token-level similarity score $\mu_{SCC}(r_i, r_j)$ is greater than a threshold then the then the pair ($r_i, r_j$) of records may pass the verification stage. In an example, if $R_{SCC}(r_i, r_j) \ge T$, then the pair ($r_i, r_j$) passes the verification stage, where T is the threshold. In another example, if $\mu_{SCC}(r_i, r_j) \ge T-0.2$, then the pair ($r_i, r_j$) passes the verification stage, where T is the threshold.

In operation 850, the processor may output a list of matched records ordered by their similarity score in response to the user query through the input/output interface 110.

As described above, disclosed are methods for standardization of names of commercial entities based on a fuzzy matching algorithm, which may simplify and streamline large database management. Using feature extraction, definition of cleansing rules, and a matching procedure with cleansed data different variations of a text may be located in a larger dataset and may be reduced to a standard form. Due to high variance between individual versions, this task may be efficiently performed using approximation as described above. Modern data systems that store large quantities of low-quality data could be improved with the proposed method without excessive costs or computational requirements.

As described above, disclosed are methods for measuring the distances between database records to fit into a wider framework capable of evaluating very large databases quickly and effectively. The system and method facilitate correlating of seemingly distant elements within data records while considering similarity on the element level as well as record level, thus facilitating more efficient data cleaning and pruning procedures.

Trials were conducted for identifying similar data elements using string matching on a laptop Intel® Core™ i5-2410M CPU running at 2.3 GHz and 4 GB RAM. In the trials, two common datasets, DBLP and Query-Log, were used. Datasets characteristics are illustrated in Table 2. The process for identifying similar data elements using string matching ("TFS"), described above, was run on DBLP dataset with q-grams 2, 3, and 4.

TABLE 1

Characteristics of datasets used in trials.

| Dataset | # of records | Total record pairs | Average length of record | Average number of tokens per record |
|---|---|---|---|---|
| DBLP | 1,039,641 | 540,426,184,620 | 100.45 | 12. |
| Query-Log | 3,489,290 | 6,087,570,607,405 | 34. | 3 |

Figure 13:
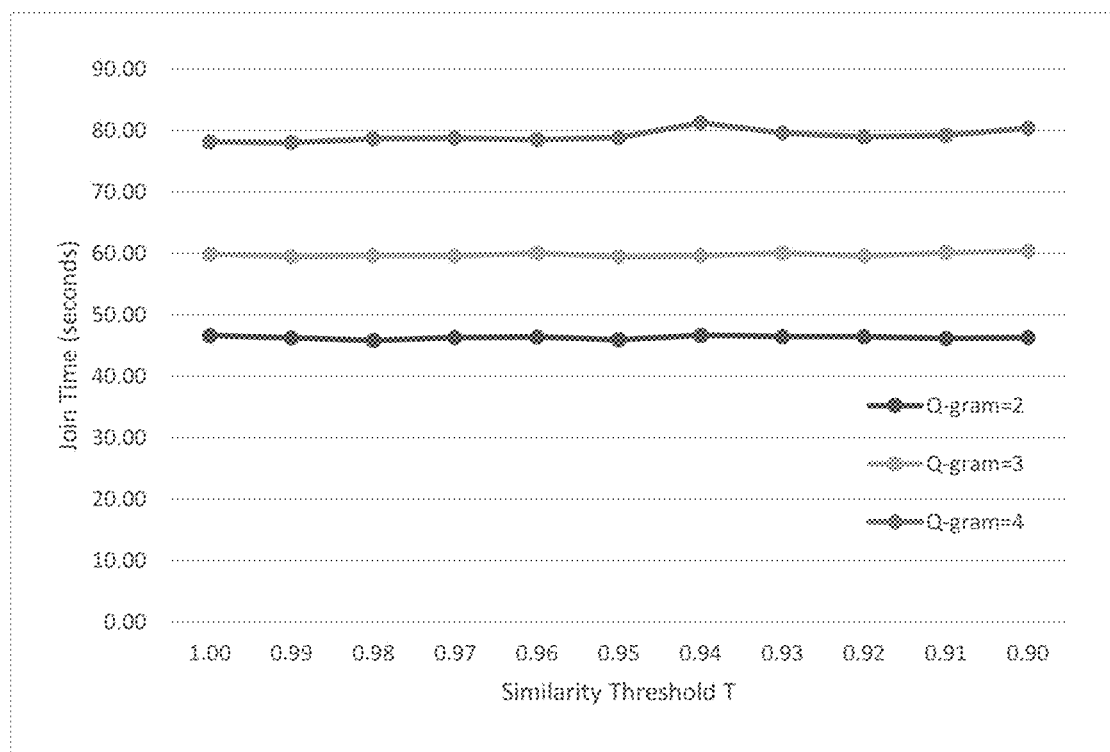
FIGS. 13-20 illustrate examples of results obtained when trials were conducted to verify and establish the efficacy of the method and apparatus for identifying similar data elements using string matching, described herein.
Figure 14:
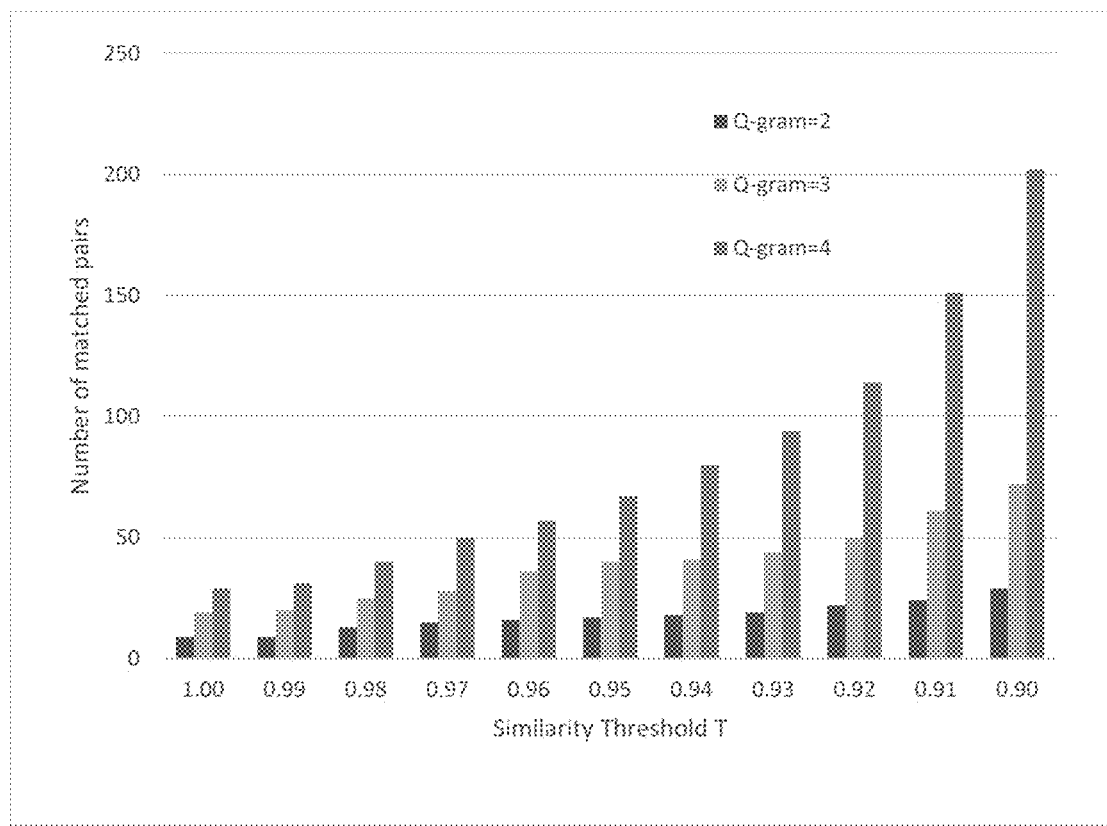

The running time is illustrated in FIG. 13 and the number of matched pairs are shown in FIG. 14. As shown in FIG. 14, the number of discovered record pairs when using q-gram=4 and T=0.95 may be similar to what may be discovered using q-gram=3 and T=0.90 in less time, 60 seconds using q=gram=3 instead of 79 seconds using q-gram=4 (as in FIG. 13). Therefore, in the subsequent trials, the q-gram may be set to 3.

To show the scalability of process for identifying similar data elements using string matching, the process was run on parts of the chosen DBLP dataset, while setting the max-q-gram-freq to 1000, q-gram to 3, and T to 0.9. The run time is shown in FIG. 15.

Figure 15:
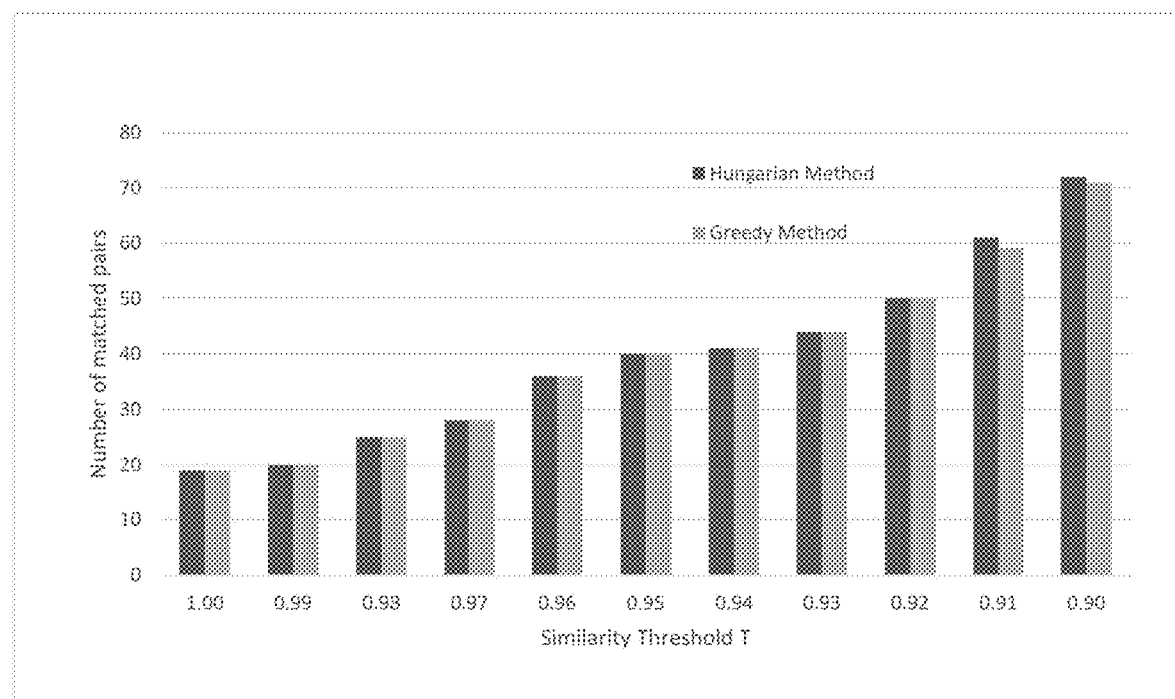

As shown from FIG. 15, when threshold decreases, greedy method fails in discovering correct record pairs, some of them are false positive. Since there is no high difference in running time between the two methods (that is because the average number of tokens per record is small), we may consider Hungarian method in the subsequent analysis.

Figure 16:
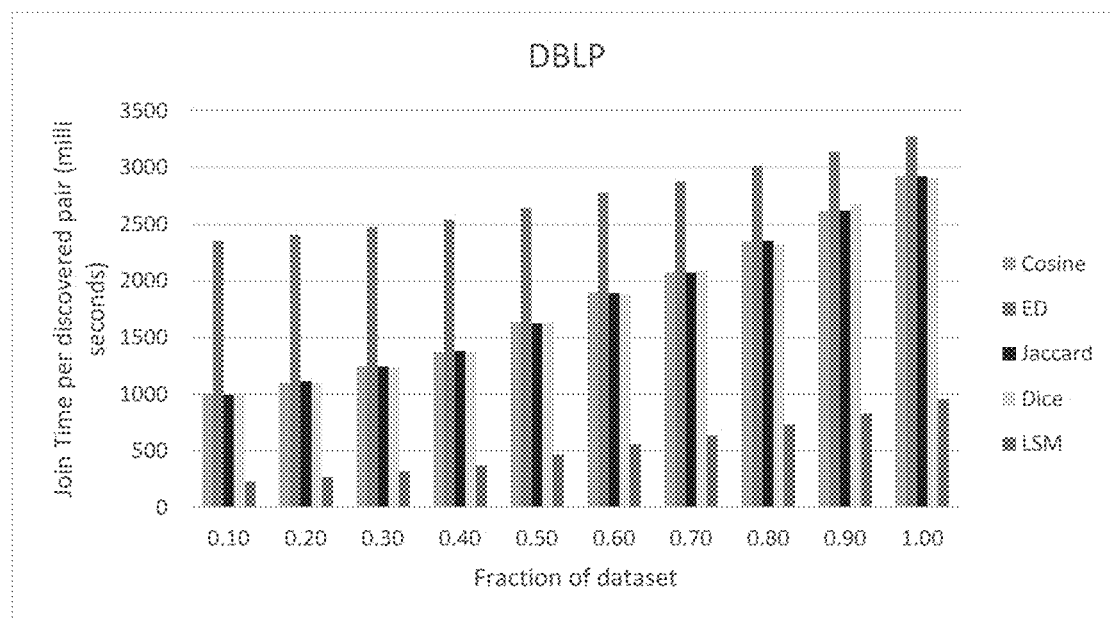
Figure 17:
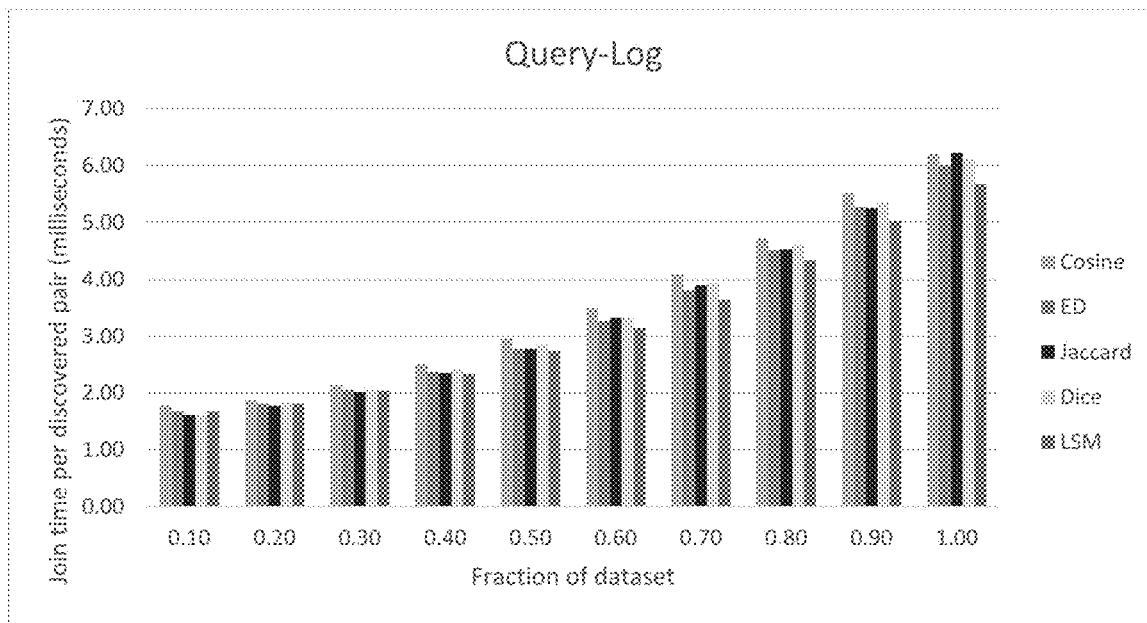

To make a fair comparison between different similarity metrics, we computed the join time per one discovered record pair for each metric using the process for identifying similar data elements using string matching, described above. The join time on both datasets with dataset faction in range (0.10-1.0) is shown in FIGS. 16-17. The results show that the LSM metric described herein outperforms the previous metrics and consumes less time to discover a record pair.

Figure 18:
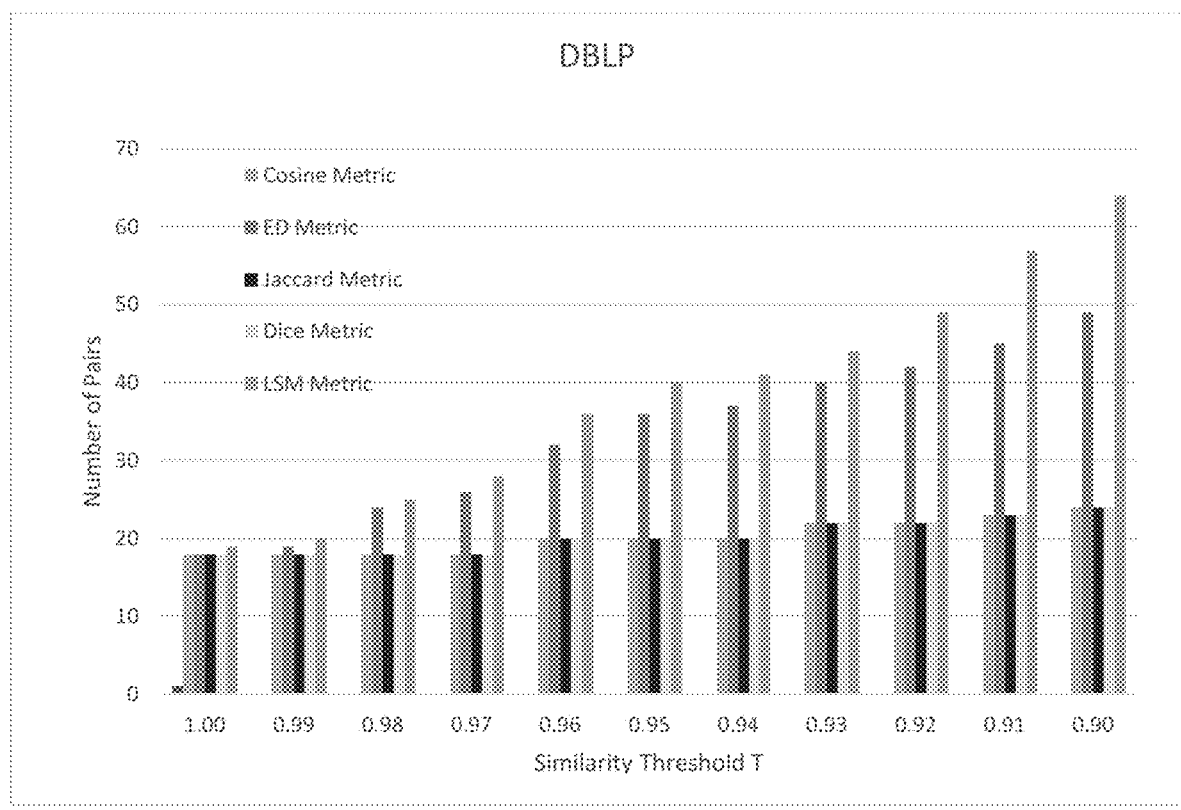

The number of candidate pairs and matched pairs in DBLP dataset are illustrated in FIG. 18.

Figure 19:
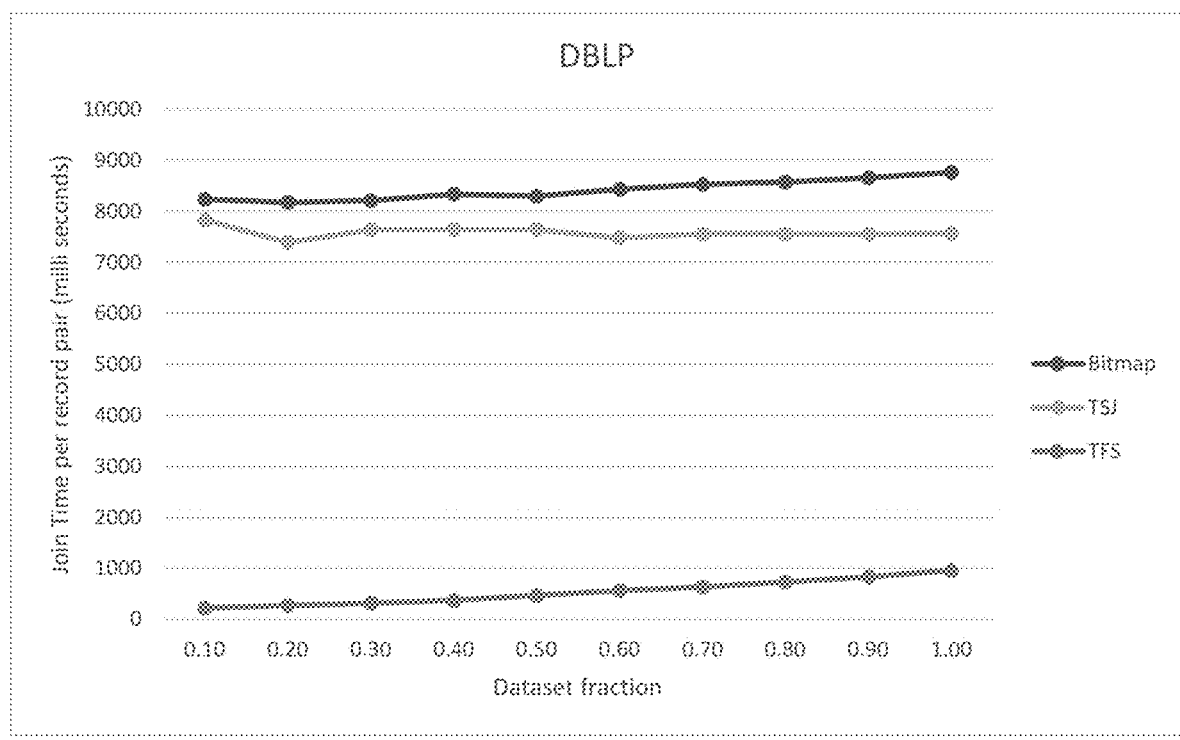
Figure 20:
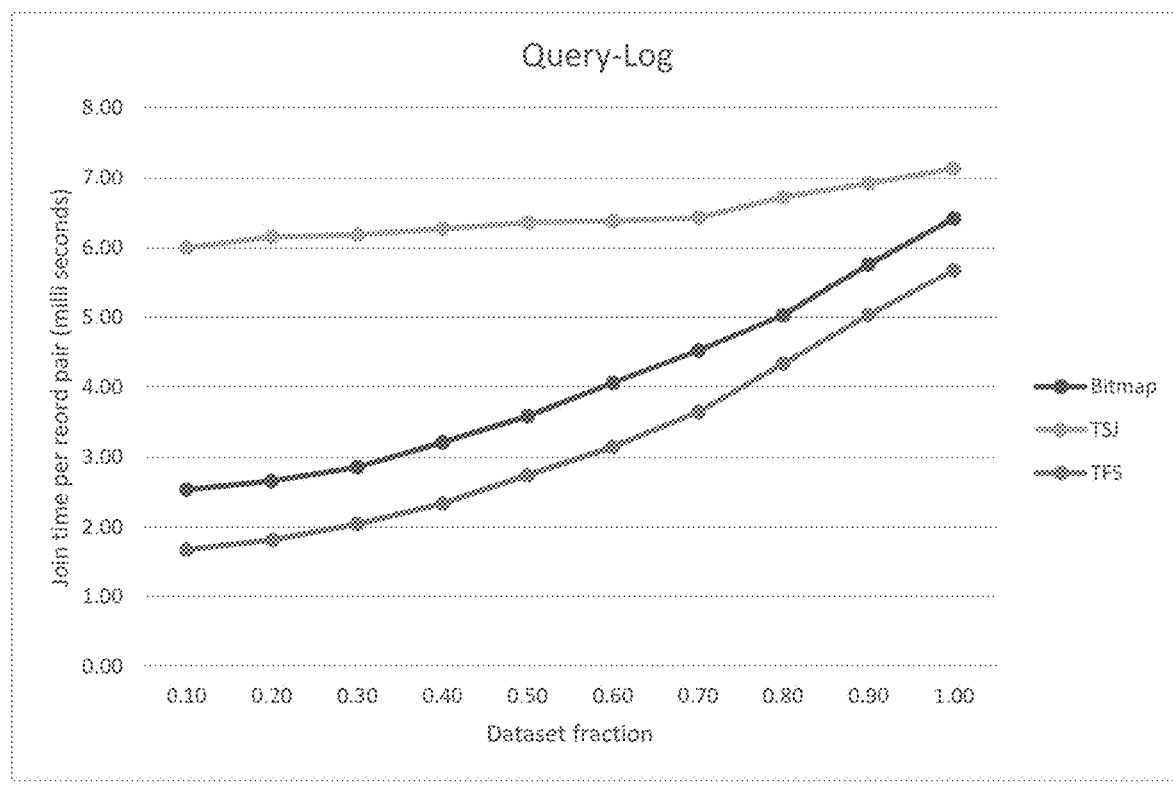

For comparison with another contemporary method, we tested the efficiency of the SCC filter with the Bitmap filter using the method for identifying similar data elements using string matching described above on DBLP and Query-Log datasets as shown in FIG. 19 and FIG. 20, respectively. As shown in the FIGS., Bitmap filter consumes much time than the SCC described above. This is because Bitmap passes more candidate pairs and most of them are not similar.

Using the method for identifying similar data elements using string matching described above, we evaluated the verified record pairs and found that all of them are similar. Thus, the higher percent of verified pairs established that the corresponding filter, which is described above, is better. The percent of verified pairs to the number of candidate pairs is listed in Table-1 below.

TABLE 2

Performance of SCC filter over Bitmap filter on DBLP dataset.

| | Bitmap filter | | | | SCC filter | | | |
|---|---|---|---|---|---|---|---|---|
| T | Candidate Pairs | Verified Pairs | Percent | Time (Seconds) | Candidate Pairs | Verified Pairs | Percent | Time (Seconds) |
| 1.00 | 180 | 19 | 10.56% | 63.06 | 19 | 19 | 100% | 62.38 |
| 0.99 | 1204 | 23 | 1.91% | 65.50 | 20 | 20 | 100% | 61.52 |
| 0.98 | 6516 | 29 | 0.45% | 75.31 | 25 | 25 | 100% | 60.69 |
| 0.97 | 19609 | 35 | 0.18% | 103.45 | 28 | 28 | 100% | 60.50 |
| 0.96 | 42709 | 43 | 0.10% | 149.47 | 36 | 36 | 100% | 62.18 |
| 0.95 | 76189 | 48 | 0.06% | 215.07 | 40 | 40 | 100% | 62.17 |
| 0.94 | 119019 | 53 | 0.04% | 296.72 | 42 | 41 | 97.62% | 63.28 |
| 0.93 | 171146 | 60 | 0.04% | 391.77 | 45 | 44 | 97.78% | 60.50 |
| 0.92 | 228429 | 69 | 0.03% | 502.73 | 52 | 49 | 94.23% | 61.19 |
| 0.91 | 291865 | 75 | 0.03% | 624.13 | 78 | 57 | 73.08% | 62.42 |
| 0.90 | 358384 | 85 | 0.02% | 740.71 | 178 | 64 | 35.96% | 62.92 |

In the trial, the SCC filter was replaced in the method for identifying similar data elements using string matching described above with Bitmap filter and the results were reported in Table 2. As established in Table 3, SCC filter is more precise than Bitmap filter. For example, when T=95, SCC filtered 40 record pairs and all of them are similar records. In contrast, Bitmap filtered 76,189 record pairs and only 48 out of them are similar. Using SCC filter and by setting T=0.90, we can obtain more similar records, 64 out of 178 candidate pairs in less running time, 62.92 seconds, instead of 215.07 seconds using Bitmap filter.

The apparatus for identifying similar data elements 100, the processor 130, the indexer 240, the preparer 230, the verifier 260, the candidate pair selector 250, and other apparatuses, units, modules, devices, and components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In an example, the instructions or software includes at least one of an applet, a dynamic link library (DLL), middleware, firmware, a device driver, an application program storing the method for identifying similar data elements. In another example, the instructions or software include higher-level code that is executed by the processor or computer using an interpreter. The instructions or software may be written using any programming language based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), magnetic RAM (MRAM), spin-transfer torque(STT)-MRAM, static random-access memory (SRAM), thyristor RAM (T-RAM), zero capacitor RAM (Z-RAM), twin transistor RAM (TTRAM), conductive bridging RAM(CBRAM), ferroelectric RAM (FeRAM), phase change RAM (PRAM), resistive RAM(RRAM), nanotube RRAM, polymer RAM (PoRAM), nano floating gate Memory(NFGM), holographic memory, molecular electronic memory device), insulator resistance change memory, dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In an example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application it will be apparent that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

Some reference numerals that may be used in the above description are described below:
Notation Description
  $F_r$ File of records
  T similarity threshold
  q q-gram
  f maximum q-gram frequency
  M verification method
  ⌒ list of similar pairs
  $A_h$ List of group hash indexes
  $A_c$ List of group character indexes
  EOF End of file
  SCC Shared character count
  $A_d$ List of address array of the q gram location in the record
  $n_c$ size of query alphabet
  m̂ Minimum length of the record
  m̂ Maximum length of the record
  LSM Log Similarity Metric
  $\mu_{SCC}$ Token-level similarity score
  $\psi_{SCC}$ Record-level similarity score
  $r_i$ record $r_i$
  $r_j$ record $r_j$
  $\psi_{SCC}(r_i, r_j)$ similarity score between record $r_i$ and $r_j$
  $|r_i|$ Length of record $r_i$
  $|r_j|$ Length of record $r_j$
  ∀ For each
  c Character
  ∈ Belong to
  Σ Alphabets
  $r_i \bowtie r_j$ Intersection between record $r_i$ and $r_j$
  $\Sigma_{r_i \bowtie r_j}$ Intersection between record $r_i$ and $r_j$ over alphabets
  $\delta(c, r_i)$ occurrences of character c in record $r_i$
  $\delta(c, r_j)$ occurrences of character c in record $r_j$
  $\min(\delta(c, r_i), \delta(c, r_j))$ Minimum number of occurrences of character c in record $r_i$ and $r_j$
  $\min(|r_i|, |r_j|)$ Minimum length of record $r_i$ and $r_j$
  $\max(|r_i|, |r_j|)$ Maximum length of record $r_i$ and $r_j$
  $\log(\min(|r_i|, |r_j|))$ Logarithm value of the minimum length of record $r_i$ and $r_j$
  $\log(\max(|r_i|, |r_j|))$ Logarithm value of the maximum length of record $r_i$ and $r_j$
  $t_{ui}$ Token u in token $t_{ui}$
  $t_{lj}$ Token l in token $t_{lj}$
  $\mu_{SCC}(t_{ui}, t_{lj})$ similarity score between token $t_{ui}$ and $t_{lj}$
  $|t_{ui}|$ Length of token $t_{ui}$
  $|t_{lj}|$ Length of token $t_{lj}$
  $\min(|t_{ui}|, |t_{lj}|)$ Minimum length of token $t_{ui}$ and $t_{lj}$
  $\max(|t_{ui}|, |t_{lj}|)$ Maximum length of token $t_{ui}$ and $t_{lj}$
  $\log(\min(|t_{ui}|, |t_{lj}|))$ Logarithm value of the minimum length of token $t_{ui}$ and $t_{lj}$
  $\log(\max(|t_{ui}|, |t_{lj}|))$ Logarithm value of the maximum length of token $t_{ui}$ and $t_{lj}$

What is claimed is:

1. A computer-implemented method for searching a data source, the method comprising:
  receiving, by an input/output interface, a textual query;
  retrieving a plurality of records from the data source to obtain a reference list of data records, each record containing at least one word;
  determining an index for the textual query;
  generating candidate records from the reference list to match the textual query based on the index and applying any one or any combination of a q-gram filter, a length filter, and a shared character count (SCC) filter;
  determining similarity scores $\mu_{SCC}(r_i, r_j)$ of each of the candidate records based on $$\frac{\sum_{1 \leq u, l \leq \min(\|r_i\|, \|r_j\|)} \frac{d(t_{ui}, t_{lj})\log(\min(|t_{ui}|, |t_{lj}|))}{\min(|t_{ui}|, |t_{lj}|)\log(\max(|t_{ui}|, |t_{lj}|))}}{\min(\|r_i\|, \|r_j\|)},$$

wherein $\mu_{SCC}$ is a similarity score, $\|r_i\|$ is the number of tokens in record $r_i$, $\|r_j\|$ is the number of tokens in record $r_j$, $|t_{ui}|$ is the length of token u in record $r_i$, and $|t_{lj}|$ is the length of token l in record $r_j$, $\min(|t_{ui}|, |t_{lj}|)$ is the minimum length of token $t_{ui}$ and $t_{lj}$, and $\max(|t_{ui}|, |t_{lj}|)$ is the maximum length of token $t_{ui}$ and $t_{lj}$;
  identifying records from among the candidate records having a similarity score $\mu_{SCC}(r_i, r_j)$ greater than or equal to a threshold;
  selecting data records similar to the textual query based on sorting the selected records according to respective similarity scores, and
  outputting, by the input/output interface, one or more of the selected data records as a response to the search,
  wherein one of the records $r_i$ and $r_j$ comprises the textual query and the other of the records $r_i$ and $r_j$ comprises a record from among the candidate records.

2. The method of claim 1, wherein the generating of the candidate records comprises generating candidate records from the reference list to match the textual query based on applying the q-gram filter and the SCC filter.

3. The method of claim 1, wherein the generating of the candidate records comprises generating candidate records from the reference list to match the textual query based on sequentially applying the length filter, the q-gram filter, and the SCC filter.

4. The method of claim 1, further comprising preprocessing the textual query, in response to receiving the textual query, wherein the preprocessing of the textual query comprises:
  determining whether the textual query comprises non-English words;
  preparing the non-English words of the textual query for transliteration, in response to the textual query containing non-English words;
  transliterating the non-English words into English;
  processing the English words of the textual query;

converting the English words to one of capital or small case; and outputting the preprocessed textual query.

5. The method of claim 4, wherein the preparing of the non-English words for transliteration comprises any one or any combination of normalization, tokenization, and diacritics processing.

6. The method of claim 4, wherein the transliterating of the non-English words into English comprises inputting the non-English words into a neural network trained to transliterate a language of the non-English words.

7. The method of claim 1, wherein the determining of the index for the textual query comprises:

determining whether a length of the textual query is greater than a length of a q-gram;

constructing a hash token comprising a hash value for each of the tokens comprised in the textual query, in response to the length of the textual query being greater than the length of the q-gram;

assigning an index to the hash token, in response to the hash token not having been previously indexed; and assigning the hash token to a cluster, in response to the hash token having been previously indexed, wherein the cluster comprises a group of hash tokens having an existing index, and wherein the length of the q-gram comprises a minimum length of searchable string.

8. The method of claim 1, wherein the obtaining of the reference list comprises:

determining whether a length of a record from among the records is greater than a length of a q-gram;

constructing a hash token comprising a hash value for each token comprised in the record, in response to the length of the record being greater than the length of the q-gram;

assigning an index to the hash token, in response to the hash token not having been previously indexed;

assigning the hash token to a cluster, in response to the hash token having been previously indexed; and accumulating the hash tokens for the respective records in the reference list, wherein the cluster comprises a group of hash tokens having an existing index, and wherein the length of the q-gram comprises a minimum length of searchable string.

9. The method of claim 7, wherein the hash value for the each token is based on $h(x, k)=((x[k-2]<<2)-x[k-1]<<2)-x[k]$, wherein, x represents the each token, $x[k]$ is an ASCI value of character located at index k, and $h(x, k)$ is the hash value of a q-gram ending at index k.

10. The method of claim 7, further comprising inputting, by the input/output interface, the length of the q-gram.

11. The method of claim 7, wherein the length of the q-gram is based on system requirements.

12. The method of claim 1, where the SCC filter is based on determining $$\psi_{SCC}(r_i, r_j) = \frac{\Sigma_{\forall c \in \Sigma_{r_i} \bowtie r_j} \min(\delta(c, r_i), \delta(c, r_j)) \log(\min(|r_i|, |r_j|))}{\min(|r_i|, |r_j|) \log(\max(|r_i|, |r_j|))},$$

wherein $\psi_{SCC}$ is a record-level similarity score between the records $r_i$ and $r_j$, $\bowtie$ is a set of characters common between the records $r_i$ and $r_j$, $\delta(c, r_i)$ is an occurrence of character c in the record $r_i$, $\delta(c, r_j)$ is an occurrences of character c in the record $r_j$, $\min(|r_i|, |r_j|)$ is the minimum length of the record $r_i$ and $r_j$, and $\max(|r_i|, |r_j|)$ is the maximum length of and record $r_i$ and $r_j$, wherein one of the records $r_i$ and $r_j$ comprises the textual query and the other of the records $r_i$ and $r_j$ comprises a record from the reference list.

13. The method of claim 1, where the q-gram filter is based on $\rho=\hat{m}(1-q+qT)-(q-1)$, wherein $\rho$ is a lower bound quorum, q is a length of a q-gram, m is a maximum length of the record, and T is a similarity threshold.

14. The method of claim 1, where the length filter is based on $\check{m} \geq \hat{m}T$, where $\check{m}$ is a minimum length of a record from among the candidate records, m is a maximum length of the record, and T is a similarity threshold.

15. A non-transitory computer-readable storage medium storing instructions that, when executed by a processor, cause the processor to perform the method of claim 1.

16. An apparatus for searching a data source, the apparatus comprising:

a non-transitory computer-readable storage medium configured to store instructions and a reference list;

an input/output interface configured to receive a textual query;

one or more processors executing the instructions to configure the one or more processors to retrieve a plurality of records from the data source to obtain a reference list of data records, each record containing at least one word;

determine an index for the textual query;

generate candidate records from the reference list to match the textual query based on the index and any one or any combination of a q-gram filter, a length filter, and a shared character count (SCC) filter;

determine similarity scores $\mu_{SCC}(r_i, r_j)$ of each of the candidate records based on $$\frac{\sum_{1 \leq u, l \leq \min(\|r_i\|, \|r_j\|)} \frac{d(t_{ui}, t_{lj}) \log(\min(|t_{ui}|, |t_{lj}|))}{\min(|t_{ui}|, |t_{lj}|) \log(\max(|t_{ui}|, |t_{lj}|))}}{\min(\|r_i\|, \|r_j\|)},$$

wherein $\mu_{SCC}$ is a similarity score, $\|r_i\|$ is the number of tokens in record $r_i$, $|\ |$ is the number of tokens in record $r_j$, $|t_{ui}|$ is the length of token u in record $r_i$, and $|t_{lj}|$ is the length of token l in record $r_j$, $\min(|t_{ui}|, |t_{lj}|)$ is the minimum length of token $t_{ui}$ and $t_{lj}$, and $\max(|t_{ui}|, |t_{lj}|)$ is the maximum length of token $t_{ui}$ and $t_{lj}$;

identify records from among the candidate records having a similarity score $\mu_{SCC}(r_i, r_j)$ greater than or equal to a threshold; and select data records similar to the textual query based on sorting the selected records according to respective similarity scores; and the input/output interface configured to output one or more of the selected data records, wherein one of the records $r_i$ and $r_j$ comprises the textual query and the other of the records $r_i$ and $r_j$ comprises a record from among the candidate records.

17. The apparatus of claim 16, wherein the one or more processors are further configured to:

determine whether a length of the textual query is greater than a length of a q-gram;

construct a hash token comprising a hash value for each of the tokens comprised in the textual query, in response to the length of the textual query being greater than the length of the q-gram;

assign an index to the hash token, in response to the hash token not having been previously indexed; and assign the hash token to a cluster, in response to the hash token having been previously indexed, wherein the cluster comprises a group of hash tokens having an existing index, and wherein the length of the q-gram comprises a minimum length of searchable string.

18. The apparatus of claim 16, wherein the one or more processors are further configured to:

read records from a data source stored in the non-transitory computer-readable storage medium;

determine whether a length of a record from among the records is greater than a length of a q-gram;

construct a hash token comprising a hash value for each token comprised in the record, in response to the length of the record being greater than the length of the q-gram;

assign an index to the hash token, in response to the hash token not having been previously indexed; and assign the hash token to a cluster, in response to the hash token having been previously indexed; and accumulate the hash tokens for the respective records in the reference list, wherein the cluster comprises a group of hash tokens having an existing index, and wherein the length of the q-gram comprises a minimum length of searchable string.

19. The apparatus of claim 17, wherein the hash value for the each token is based on $h(x, k) = ((x[k-2] << 2) - x[k-1] << 2) - x[k]$, wherein, x represents the each token, $x\lfloor k \rfloor$ is an ASCI value of character located at index k, and $h(x, k)$ is the hash value of a q-gram ending at index k.

20. The apparatus of claim 16, where the shared SCC filter is based on determining $$\psi_{SCC}(r_i, r_j) = \frac{\sum_{c \in \Sigma_{r_i} \bowtie r_j} \min(\delta(c, r_i), \delta(c, r_j)) \log(\min(|r_i|, |r_j|))}{\min(|r_i|, |r_j|) \log(\max(|r_i|, |r_j|))},$$

wherein $\psi_{SCC}$ is a record-level similarity score between the records $r_i$ and $r_j$, $\bowtie$ is a set of characters common between the records $r_i$ and $r_j$, $\delta(c, r_i)$ is an occurrence of character c in the record $r_i$, $\delta(c, r_j)$ is an occurrences of character c in the record $r_j$, $\min(|r_i|, |r_j|)$ is the minimum length of the record $r_i$ and $r_j$, and $\max(|r_i|, |r_j|)$ is the maximum length of and record $r_i$ and $r_j$, wherein one of the records $r_i$ and $r_j$ comprises the textual query and the other of the records $r_i$ and $r_j$ comprises a record from the reference list.

21. The apparatus of claim 16, where the q-gram filter is based on $\rho = \hat{m}(1-q+qT)-(q-1)$, wherein $\rho$ is a lower bound quorum, q is a length of a q-gram, m is a maximum length of the record, and T is a similarity threshold.

22. The apparatus of claim 16, where the length filter is based on $\check{m} \geq \hat{m}T$, where $\check{m}$ is a minimum length of a record from among the candidate records, $\hat{m}$ is a maximum length of the record, and T is a similarity threshold.

* * * * *